United States Patent [19]

Masaki et al.

[11] Patent Number: 5,481,510
[45] Date of Patent: Jan. 2, 1996

[54] SEEK CONTROL SYSTEM FOR OPTICAL STORAGE APPARATUS

[75] Inventors: Takashi Masaki; Shigenori Yanagi, both of Kawasaki, Japan

[73] Assignee: Fujitsu Limited, Kawasaki, Japan

[21] Appl. No.: 421,043

[22] Filed: Apr. 12, 1995

Related U.S. Application Data

[63] Continuation of Ser. No. 23,103, Feb. 26, 1993, abandoned.

[30] Foreign Application Priority Data

Feb. 28, 1992 [JP] Japan .................................. 4-042682
Feb. 28, 1992 [JP] Japan .................................. 4-042683

[51] Int. Cl.⁶ ........................................................ G11B 7/00
[52] U.S. Cl. .......................................... 369/32; 369/44.14
[58] Field of Search .................................. 369/32, 44.11, 369/44.28, 44.14, 215

[56] References Cited

U.S. PATENT DOCUMENTS

| | | | |
|---|---|---|---|
| 4,837,757 | 6/1989 | Okada et al. | 369/32 |
| 5,021,898 | 6/1991 | Sakai et al. | 369/32 |
| 5,042,019 | 8/1991 | Kitai et al. | 369/32 |
| 5,218,453 | 6/1993 | Hashimoto | 369/32 |
| 5,247,498 | 9/1993 | Takekoshi et al. | 369/32 |
| 5,268,883 | 12/1993 | Yamaguchi et al. | 369/32 |

FOREIGN PATENT DOCUMENTS

| | | | |
|---|---|---|---|
| 61-214229 | 9/1986 | Japan . | |
| 63-281231 | 11/1988 | Japan | 369/32 |
| 460973 | 2/1992 | Japan . | |

Primary Examiner—Georgia Y. Epps
Assistant Examiner—Tan Dinh
Attorney, Agent, or Firm—Greer, Burns & Crain, Ltd.

[57] ABSTRACT

A seek control system used in an optical storage apparatus to move an optical head, which at least reads information from an optical disk by applying light thereto, to a target position on the optical disk. The seek control system includes a positioner for moving the optical head for seek, and a one-dimensional optical position detector having a photo-sensitive surface disposed in the path of movement of the optical head to output a position signal corresponding to a light spot position on the photo-sensitive surface. The seek control system further includes a light-emitting device provided on either the optical head or the positioner to apply light to the one-dimensional optical position detector, and a controller for controlling the drive of the positioner on the basis of a position detection output of the one-dimensional optical position detector.

31 Claims, 19 Drawing Sheets

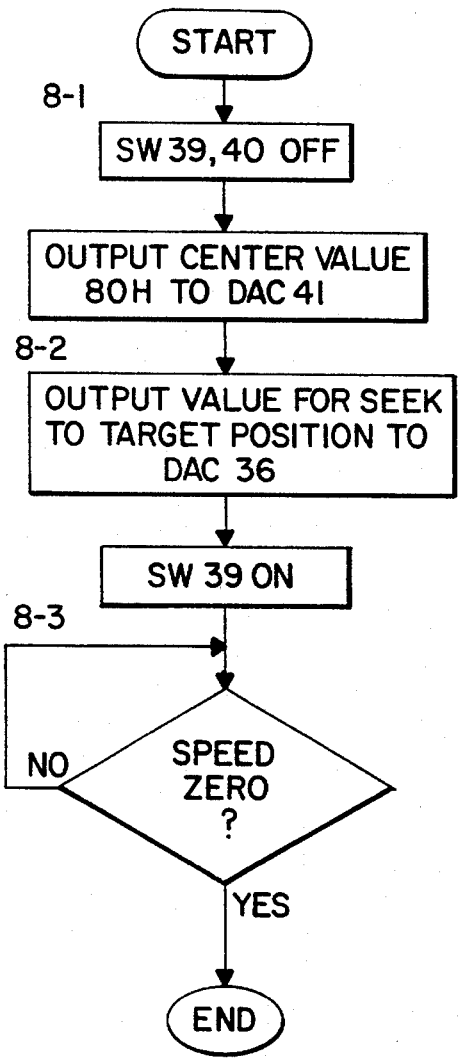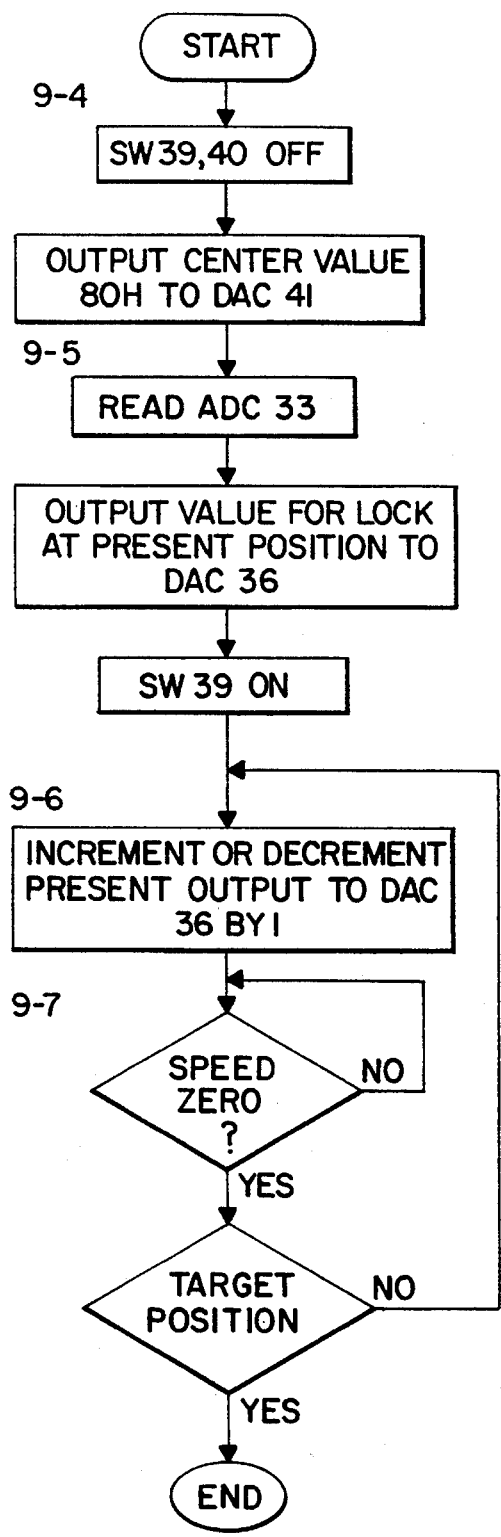

SEEK CONTROL SYSTEM FOR OPTICAL STORAGE APPARATUS

RELATED APPLICATION

This is a continuation of application Ser. No. 08/023,103, filed on Feb. 26, 1993 and now abandoned.

BACKGROUND OF THE INVENTION

1. Field of the Invention

The present invention relates to a seek control system for moving an optical head of an optical storage apparatus to a given position for seek. More particularly, the present invention relates to a seek control system designed to detect the absolute position of an optical head moved by a positioner and to move the optical head to a target position on the basis of the detected absolute position.

In a typical optical disk drive unit (including magneto-optical disk drive unit), illuminating light from a laser diode in an optical head is applied to the surface of a rotating disk-shaped recording medium, i.e., optical disk, thereby recording information. The recorded information is reproduced by detecting changes in properties (quantity of light, plane of polarization, etc.) of the reflected light from the optical disk, which is illuminated with the light from the optical head. The optical disk has information tracks provided over the surface thereof from the inner periphery to the outer periphery of the disk. Accordingly, it is necessary in order to record or reproduce information on or from a desired track to move the optical head for seek in the radial direction of the optical disk. For this purpose, a seek mechanism for moving the optical head radially of the optical disk is needed.

2. Description of the Related Art

A typical optical disk has a user zone containing information tracks and other zones which are used by an optical disk drive unit. The seek operation of the optical head in the user zone is effected by detecting track crossing on the basis of the reflected light from grooves on the optical disk illuminated with the light from the optical head. That is, in the seek operation, the optical head is moved through a distance corresponding to the desired number of tracks by starting counting track crossing detecting pulses at the same time as the optical head begins to move. With this method, the optical head can be accurately positioned with respect to the desired track.

On the other hand, when the optical head is to be moved to a zone other than the user zone, since this zone has no track provided therein and the seek operation must be executed within a short period of time, for example, during the initial processing of the system, the above-described seek method, which is based on the detection of track crossing, is not suitable. Accordingly, it is common practice to employ a seek method wherein the absolute position of the optical head is detected and the optical head is moved to a specified position on the basis of the detected absolute position. With this method, seek can also be effected where no track is provided. In addition, since no track crossing is detected, a high-speed seek operation can be realized.

The above-described method, wherein seek is effected by detecting the absolute position of the optical head, can be effectively carried out by detecting the absolute position of the optical head with an absolute position detector provided in the path of movement of the optical head. Various methods are available for the detection of the absolute position of the optical head. Among them, a method that employs a photo-sensitive detector enables high-speed seek because the absolute position of the optical head can be detected in a non-contact manner and therefore no load is imposed on the seek operation.

Accordingly, there has been proposed a method wherein the absolute position of the optical head is detected with a one-dimensional photo-sensitive detector provided in the path of movement of the optical head. According to the proposed method, the reflected light from the optical disk, which is illuminated with the light from the optical head, is applied to a one-dimensional photo-sensitive detector, and the absolute position of the optical head is detected from a current output corresponding to the illuminated position of the photo-sensitive detector. Then, the drive part for the optical head is controlled on the basis of a difference between the detected absolute position and a target position (for example, see Japanese Patent Application Laid-Open-(KOKAI) No.63-281231 (1988)).

With the above-described method, however, the illuminating light from the optical head that is reflected from the optical disk is used as light applied to the photo-sensitive detector. Accordingly, position detection cannot be effected for a seek operation in which the optical head emits no light, e.g., before the adjustment of light emission from the optical head. Therefore, such a seek operation cannot be effected. Further, since the reflected light from the optical disk depends on the quantity of laser light from the optical head and the reflectivity of the medium constituting the optical disk, it is likely that the level of the reflected light will fluctuate, resulting in a lowering in the position detection sensitivity of the photo-sensitive detector. In such a case, accurate seek may not be realized. In addition, the optical path lengthens in order to lead the reflected light from the optical disk to the photo-sensitive detector, so that the light efficiency lowers, and the detection sensitivity of the photo-sensitive detector lowers.

OBJECT AND SUMMARY OF THE INVENTION

It is an object of the present invention to provide an improved seek control system for an optical storage apparatus.

It is another object of the present invention to provide a seek control system for an optical storage apparatus, which is capable of accurately detecting the position of the optical head even when the optical head is not emitting light.

It is still another object of the present invention to provide a seek control system for an optical storage apparatus, which is designed so that the detection sensitivity of a one-dimensional optical position detector is improved to realize an accurate seek operation.

It is a further object of the present invention to provide a seek control system for an optical storage apparatus, which is capable of seeking a specified position accurately even if there is variation in the detection sensitivity among one-dimensional optical position detectors or an error in mounting of the one-dimensional optical position detector.

The present invention provides a seek control system used in an optical storage apparatus to move an optical head for at least reading information from an optical storage medium to a given position on the optical storage medium. The seek control system includes a positioner for moving the optical head to seek a given position, a one-dimensional optical position detector provided in the path of movement of the optical head to output a position signal corresponding to a light spot position, a light-emitting means provided on the positioner to apply light to the one-dimensional optical position detector, and means for controlling the drive of the positioner on the basis of a difference between a target position and the position detection output of the one-dimensional optical position detector.

According to the seek control system of the present invention, since the absolute position of the optical head is detected with the one-dimensional optical position detector, position detection can be effected in a non-contact manner. Thus, the seek operation can be effected smoothly at high speed. In addition, since the light-emitting means is additionally provided, an adequate quantity of light can be applied to the one-dimensional optical position detector, and there is no fluctuation in the quantity of light. Therefore, the position detection accuracy can also be improved. Thus, accurate seek can be realized.

In addition, the present invention provides a seek control system used in an optical storage apparatus to move an optical head for at least reading information from an optical storage medium to a given position on the optical storage medium. The seek control system includes a seek mechanism for moving the optical head to seek a given position, a one-dimensional optical position detector provided in the path of movement of the optical head to output a position signal corresponding to a light spot position, a light-emitting means provided on the positioner to apply light to the one-dimensional optical position detector, and means for controlling the drive of the seek mechanism on the basis of a difference between a drive signal corresponding to a target position and the position detection output of the one-dimensional optical position detector. The control means calculates the drive signal from the target position.

In addition, the present invention provides a seek control system used in an optical storage apparatus to move an optical head for at least reading information from an optical storage medium to a given position on the optical storage medium. The seek control system includes a seek mechanism for moving the optical head to seek a given position, a one-dimensional optical position detector provided in the path of movement of the optical head to output a position signal corresponding to a light spot position, a light-emitting means provided on the seek mechanism to apply light to the one-dimensional optical position detector, and means for controlling the drive of the seek mechanism on the basis of a difference between a drive signal corresponding to a target position and the position detection output of the one-dimensional optical position detector. The control means generates a drive output for positioning the positioner at each of two predetermined points. After positioning the seek mechanism at each of the two points, the control means reads the detection output of the one-dimensional optical position detector and measures a relationship between the drive output and the detection output. Then, the control means generates a drive output for positioning the positioner at each of two reference points. After positioning the positioner at each of the two reference points, the control means reads the detection output of the one-dimensional optical position detector and measures a relationship between the reference position and the detection output to obtain a relationship of the drive output to the target position.

According to the present invention, an accurate drive output corresponding to the target position is obtained, so that an accurate seek operation can be realized independently of variations in circuits, devices, etc. among drive units.

Other features and advantages of the present invention will be apparent from the following description taken in conjunction with the accompanying drawings.

BRIEF DESCRIPTION OF THE DRAWINGS

FIG. 8 is a flowchart showing seek processing according to a first embodiment of the present invention.

FIG. 9 is a flowchart showing seek processing according a second embodiment of the present invention.

DESCRIPTION OF THE PREFERRED EMBODIMENTS

Figure 1:
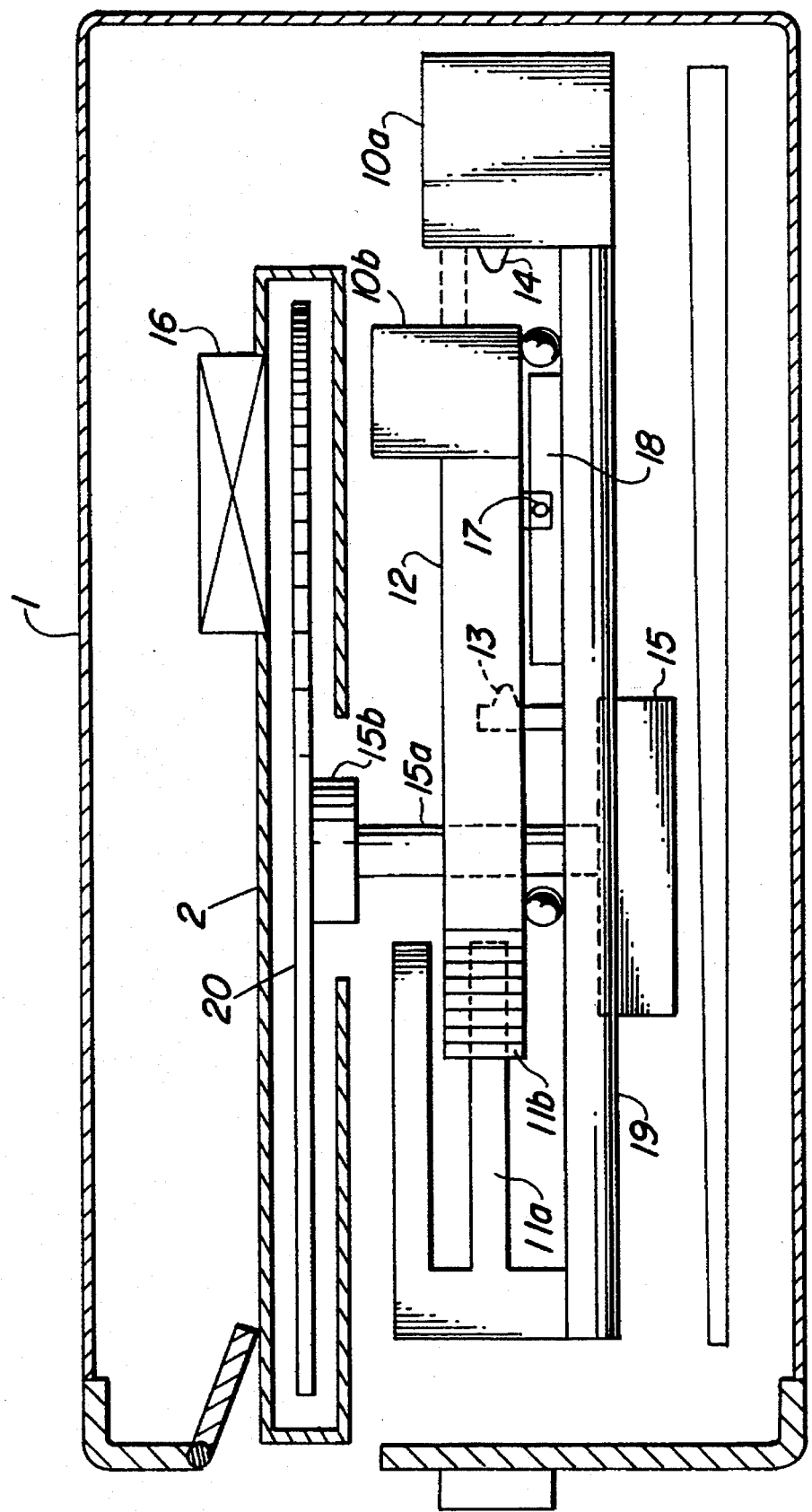
FIG. 1 is a sectional view of a magneto-optical disk drive according to one embodiment of the present invention.
Figure 2:
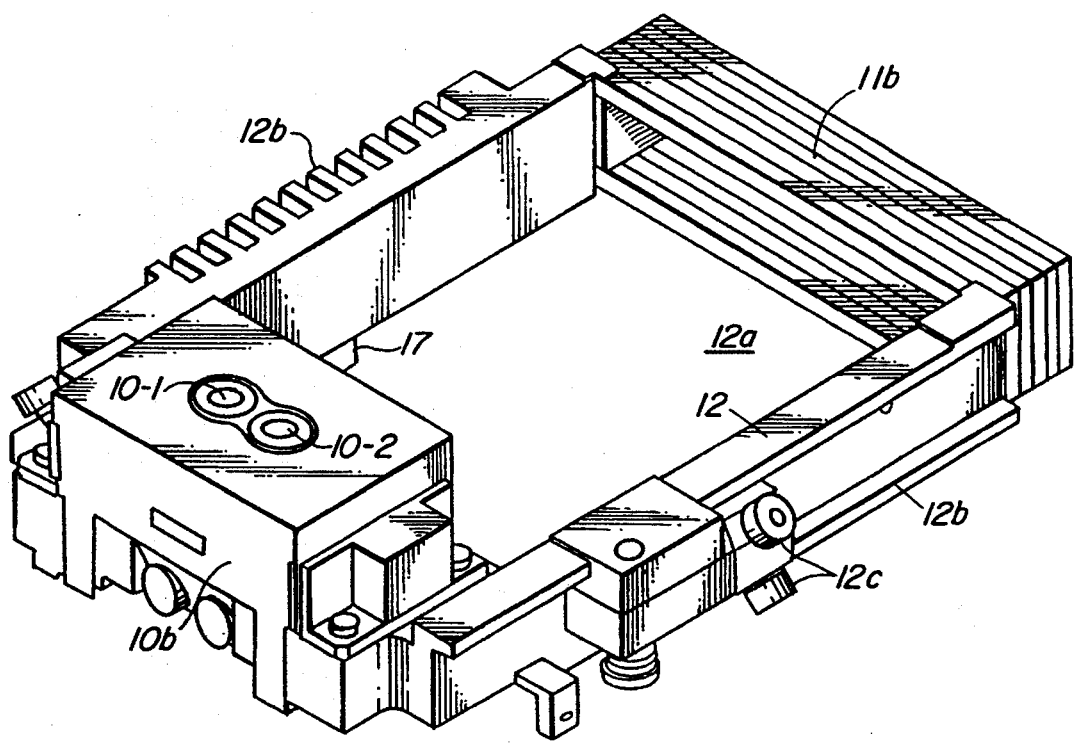
FIG. 2 is a perspective view of a positioner in the magneto-optical disk drive shown in FIG. 1.
Figure 3:
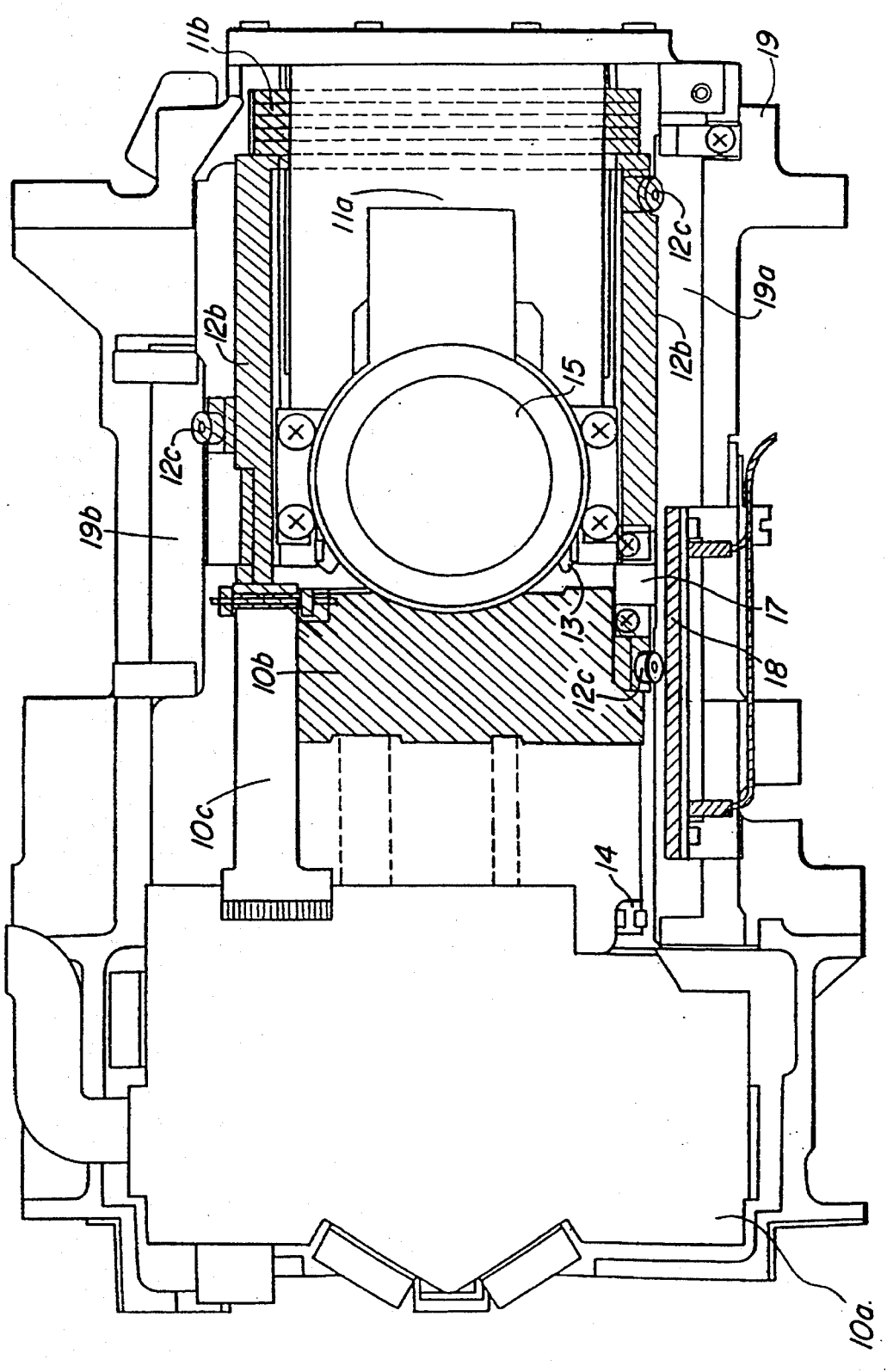
FIG. 3 is a rear view of a seek mechanism of the magneto-optical disk drive shown in FIG. 1.
Figure 4:
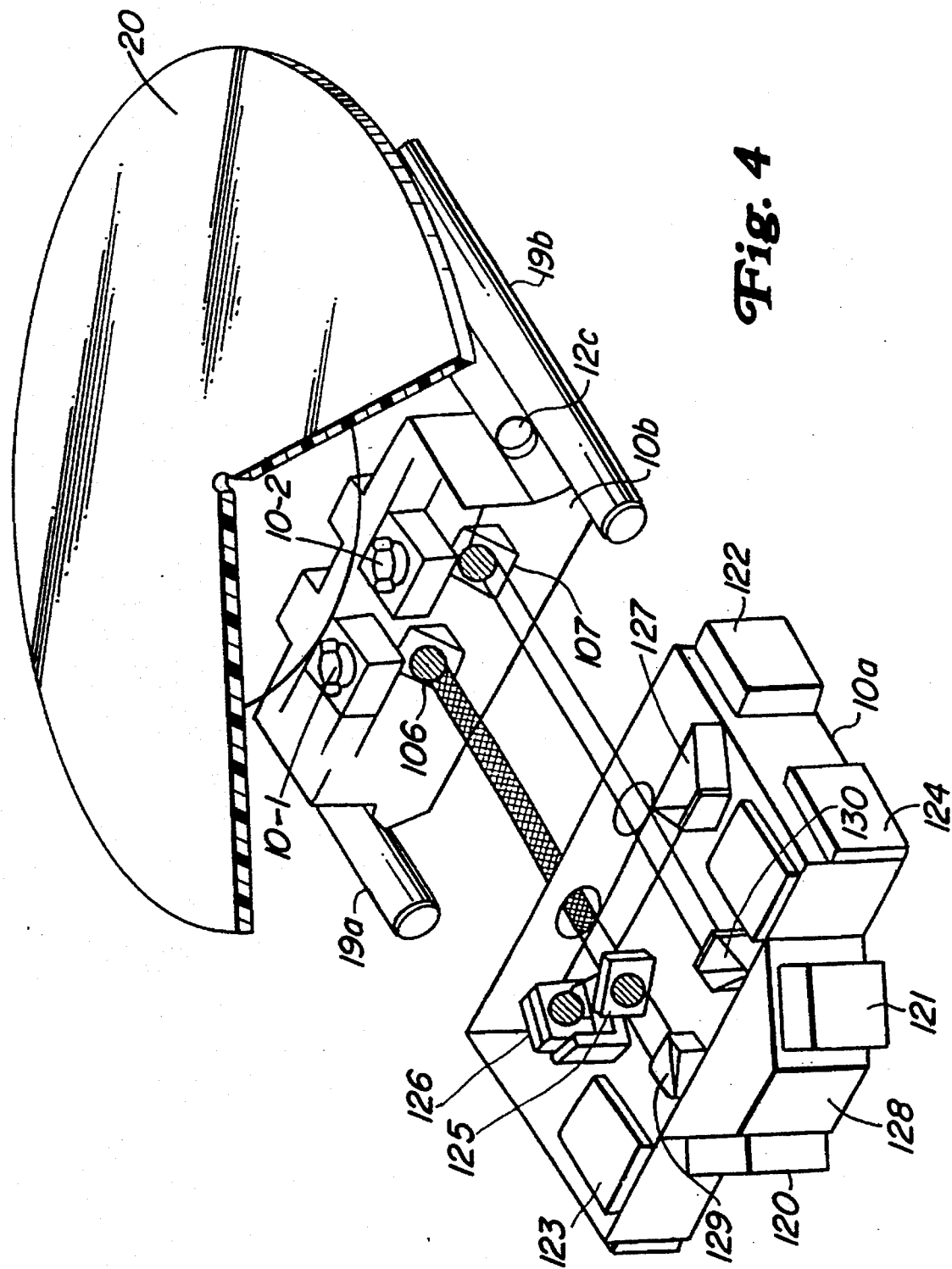
FIG. 4 is a perspective view of an optical head in the arrangement shown in FIG. 3.
Figure 5:
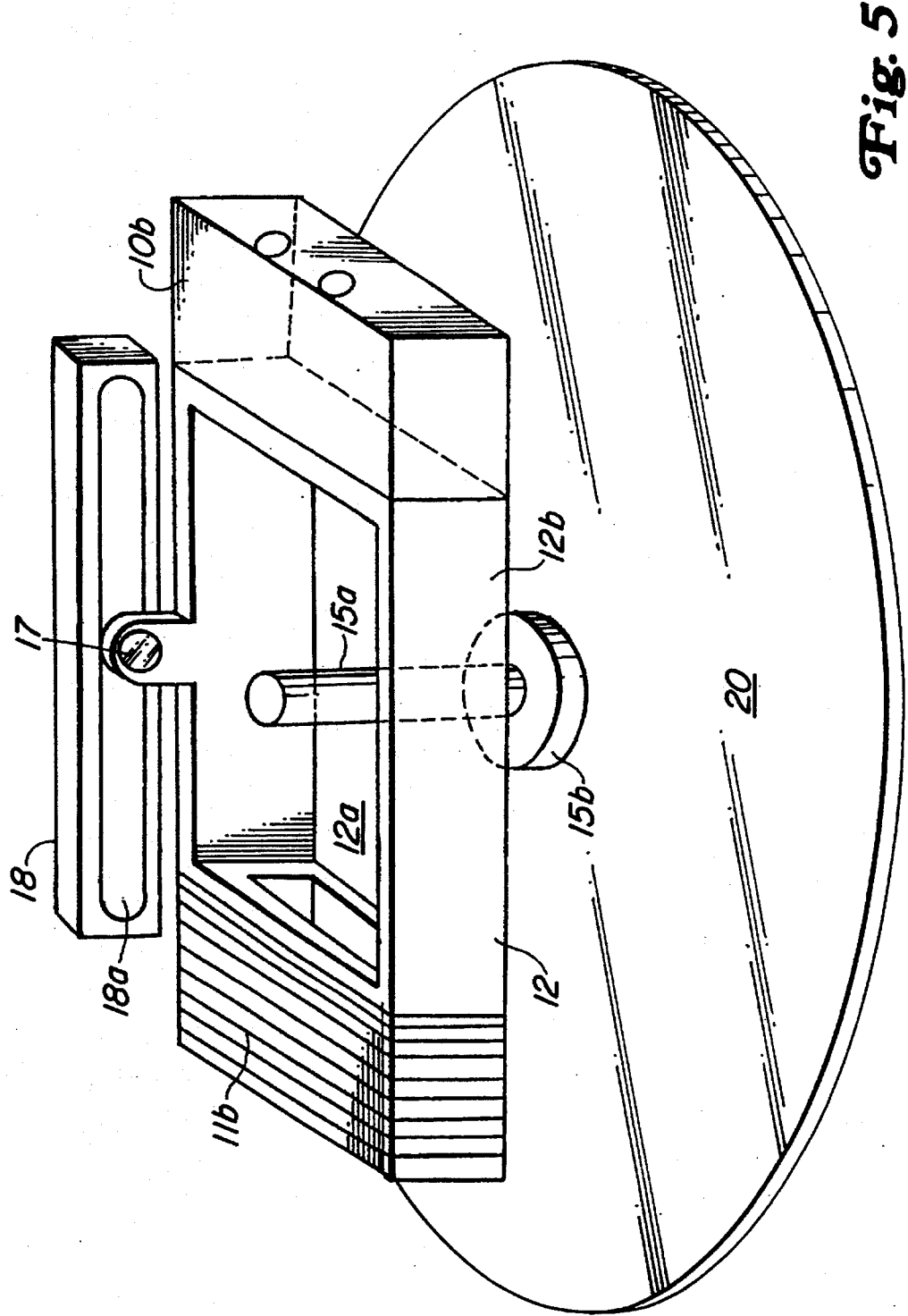
FIG. 5 is a rear perspective view of the seek mechanism shown in FIG. 3.

FIG. 1 is a sectional view of a magneto-optical disk drive according to one embodiment of the present invention; FIG. 2 is a perspective view of a positioner shown in FIG. 1; FIG. 3 is a rear perspective view of a seek mechanism shown in FIG. 1; FIG. 4 is a perspective view of an optical head shown in FIG. 1; and FIG. 5 is a rear perspective view of the seek mechanism shown in FIG. 1.

Referring to FIG. 1, a magneto-optical disk drive 1 is loaded with an optical disk cartridge 2 to read and/or write a magneto-optical disk 20 in the optical disk cartridge 2 loaded. The magneto-optical disk drive 1 ejects the optical disk cartridge 2 in response to an eject instruction. A fixed part 10a of an optical head 10 is secured to a base 19. The fixed part hereinafter referred to as "fixed head") 10a accommodates a light-emitting part, a light-receiving part, etc. among components of the optical head 10. A movable part 10b of the optical head 10 is secured to a positioner 12 and optically connected to the fixed head 10a. The movable part (hereinafter referred to as "movable head") 10b accommodates a lens optical system for applying light to the magneto-optical disk 20 in the optical disk cartridge 2.

A VCM magnet 11a is secured to the base 19 to constitute a magnet of a voice coil motor (VCM) 11. A VCM coil 11b is provided in the positioner 12 to constitute a coil of the VCM 11. Thus, the VCM coil 11b constitutes the voice coil motor 11 in combination with the VCM magnet 11a. By the operation of the voice coil motor 11, the movable head 1ob is driven radially of the magneto-optical disk 20. Reference numeral 12 denotes a positioner which is provided with the movable head 10b and the VCM coil 11b. The positioner 12 is movable radially of the magneto-optical disk 20 relative to the base 19.

An inner stopper 13 for the positioner 12 is provided on the base 19 to define a mechanical inner limit position of the positioner 12. An outer stopper 14 for the positioner 12 is provided on the base 19 to define a mechanical outer limit position of the positioner 12. A spindle motor 15 is provided on the base 19 to rotate the magneto-optical disk 20. The spindle motor 15 has a rotating shaft 15a provided with a chucking mechanism 15b for chucking the magneto-optical disk 20 in the optical disk cartridge 2. A bias magnet 16 applies a magnetic field to the magneto-optical disk 20 to enable writing to the magneto-optical disk 20 by light.

A light-emitting device 17 comprises a light emitting diode (LED) and is provided on the bottom of the positioner 12 to apply light to a one-dimensional optical position detector 18. The one-dimensional optical position detector 18 comprises a one-dimensional photo-sensitive light detector (S3270, available from Hamamatsu Photoelectronics K.K.) and is provided on the base 19 along the path of movement of the positioner 12. The one-dimensional optical position detector 18 generates a current output corresponding to a position illuminated with light from the LED 17 to thereby effect position detection. Reference numeral 19 denotes a base on which are mounted the spindle motor 15, the fixed head 10a, the VCM magnet 11a, the one-dimensional position detector 18, the inner stopper 13, the outer stopper 14 and so forth. The optical disk cartridge 2 has the magneto-optical disk 20 accommodated therein and is removably loaded into the magneto-optical disk drive 1.

As shown in the perspective view of FIG. 2, the positioner 12 has a pair of connection blocks 12b. The VCM coil 11b is secured to the rear ends of the connection blocks 12b. The movable head 1ob is secured to the forward ends of the connection blocks 12b. A space 12a is defined between the connection blocks 12b. As shown in FIG. 1, the shaft 15a and chuck mechanism 15b of the spindle motor 15 are disposed in the space 12a. The space 12a is formed with such a size that the shaft 15a and chuck mechanism 15b of the spindle motor 15 will not interfere with the positioner 12 within the range of movement thereof. In addition, guide rollers 12c are provided on both sides, respectively, of each connection block 12b, thereby enabling smooth movement of the positioner 12. The above-described LED 17 is provided on one of the connection blocks 12b in the vicinity of the movable head 10b.

The movable head 10b is provided with a write/read head 10-1 and an erase head 10-2. The heads 10-1 and 10-2 each apply light to the magneto-optical disk 20, which lies above them as viewed in the figure, and receive the reflected light from the disk 20. As shown in FIG. 2, the LED 17 is provided on the lower side of one connection block 12b, that is, the side which faces away from the direction in which the heads 10-1 and 10-2 of the movable head 10b apply light (upwardly as viewed in the figure). With the arrangement that the LED 17 is provided on the side that faces away from the direction in which the movable head 10b applies light, there is no likelihood that stray light of the illuminating light from the movable head 10 or the reflected light will intermingle with the light from the LED 17. Therefore, accurate position detection can be realized.

As shown in the rear view of FIG. 3, the fixed head 10a is secured to one end of the base 19, while the VCM coil 11a is secured to the other end of the base 19. The fixed head 10a and the movable head 10b are electrically connected together through a flexible cable 10c. The spindle motor 15 is provided in the center of the base 19. Guide rods 19a and 19b are provided on both sides, respectively, of the central portion of the base 19. The guide rods 19a and 19b are each held by the pair of guide rollers 12c provided on the corresponding connection block 12b of the positioner 12. Thus, the rectilinear movement of the positioner 12 relative to the base 19 is guided.

Further, the one-dimensional photo-sensitive light detector 18 is provided on one side of the base 19 in parallel to the path of movement of the positioner 12. The one-dimensional photo-sensitive light detector 18 comprises a Si photodiode, as is well known, and generates a current output corresponding to the position of a light spot on the photo-sensitive surface of the photodiode. The details of this principle are described, for example, in the August 1990 issue of the monthly magazine of "Transistor Technology", pp.468–470. The LED 17 is provided on the positioner 12 at a position which faces the one-dimensional photo-sensitive light detector 18.

Next, the movable head 10b and the fixed head 10a will be explained. As shown in FIG. 4, the fixed head 10a is a 3-beam type head, which has as light sources a laser diode for write 120, a laser diode for erase 121, and a laser diode for read 122. The fixed head 10a has a detector for write/read 123 that receives the reflected light from the magneto-optical disk 20 during a read/write operation, and a detector for erase 124 that receives the reflected light from the magneto-optical disk 20 during an erase operation. Further, the fixed head 10a has three prisms 129, 130 and 127, a half-mirror 125, and a galvano-mirror 126.

On the other hand, the movable head 10b has the write/read head 10-1 and the erase head 10-2, as has been described in connection with FIG. 2. The heads 10-1 and 10-2 each have an objective lens and a track/focus actuator for driving the objective; lens in track and focus directions. Further, the movable head 10b has optical path changing mirrors 106 and 107.

The optical head 10, which comprises the movable head 10b and the fixed head 10a, constitutes a 3-beam, 2-head optical head. Accordingly, during read/tracking, light from the laser diode for read 122 of the fixed head 10a enters the half-mirror 125 via the prism 127 and the galvano-mirror 126. The incident light is reflected by the half-mirror 125 so as to emerge from the fixed head 10a and enter the movable head 10b. At the movable head 10b, the incident light from the fixed head 10a is led to the write/read head 10-1 by the optical path changing mirror 106 and applied to the magneto-optical disk 20 by the write/read head 10-1. The reflected light from the magneto-optical disk 20 is received by the write/read head 10-1 and then reflected by the optical path changing mirror 106 so as to go out to enter the fixed head 10a. At the fixed head 10a, the incident light from the movable head 10b is received by the detector 123 via the half-mirror 125 and the prism 129. In this way, a track/focus error signal and a readout signal are obtained.

Similarly, during writing, light from the laser diode for write 120 of the fixed head 10a is directed to enter the movable head 10b via the prism 129 and the half-mirror 125. At the movable head 10b, the incident light from the fixed head 10a is led to the write/read head 10-1 by the optical path changing mirror 106 and applied to the magneto-optical disk 20 by the write/read head 10-1. The reflected light from the magneto-optical disk 20 is received by the write/read head 10-1 and then directed by the optical path changing mirror 106 so as to go out to the fixed head 10a. At the fixed head 10a, the incident light from the movable head 10b is received by the detector 123 via the half-mirror 125 and the prism 129.

During erasing, light from the detector for erase 124 of the fixed head 10a is directed to enter the movable head 10b via the prism 130. At the movable head 10b, the incident light from the fixed head 10a is led to the erase head 10-2 by the optical path changing mirror 107 and applied to the magneto-optical disk 20 by the erase head 10-2. The reflected light from the magneto-optical disk 20 is received by the erase head 10-2 and then directed by the optical path changing mirror 107 so as to go out to the fixed head 10a. At the fixed head 10a, the incident light from the movable head 10b is received by the detector 124 via the prism 130.

Thus, the optical head 10 is divided into the movable head 10b that is equipped with only movable parts, i.e., the objective lens, the track/focus actuator, etc., and the fixed head 10a that is equipped with the light-emitting part, the light-receiving part and the associated optical systems, and the fixed head 10a and the movable head 10b are optically connected to each other. With this arrangement, it is possible to reduce the weight of the movable head 10b, which is a movable part, and hence possible to drive it at high speed. Accordingly, the seek time can be shortened.

Further, as shown in FIG. 5, the one-dimensional photo-sensitive light detector 18 is provided on the reverse side, which faces away from the direction in which the movable head 10b applies light, and the LED 17 is provided on the positioner 12 in the vicinity of the movable head 10b. Thus, since the light-emitting part 17 is provided independently, it is possible to effect position detection and perform a seek operation even when the optical head 10 emits no light. In addition, it is possible to obtain an adequate quantity of light to effect accurate position detection by the one-dimensional photo-sensitive light detector 18. Thus, an accurate seek operation can be realized. Further, since the positioner 12 is arranged so as to provide the space 12a for the shaft 15a of the spindle motor 15, the width of the system can be reduced with a high-speed VCM used as the VCM 11.

Figure 6:
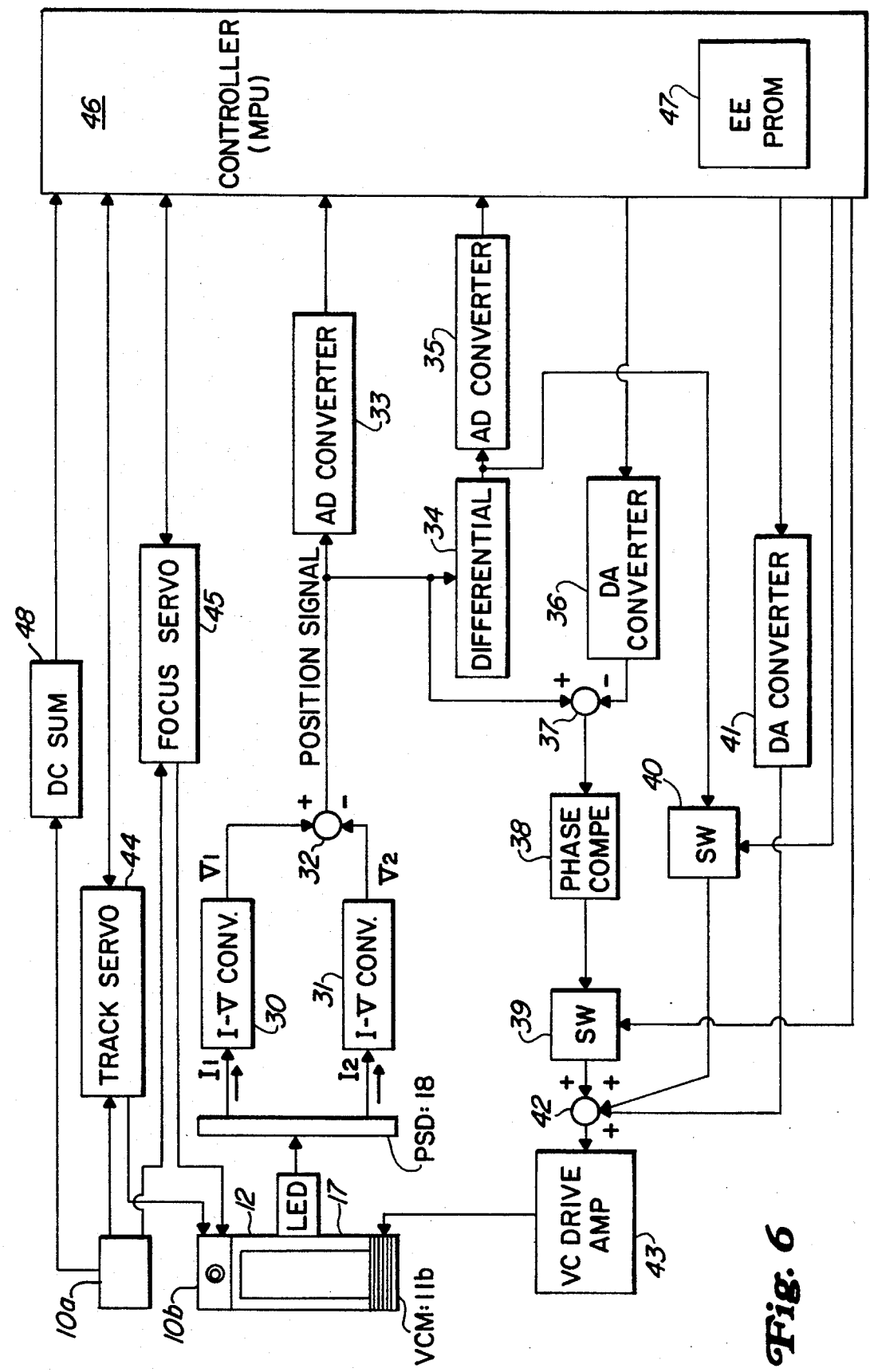
FIG. 6 is a block diagram of a seek control circuit according to one embodiment of the present invention.

Next, a seek control circuit will be explained with reference to FIG. 6. In FIG. 6, current-to-voltage converters 30 and 31 convert current outputs I1 and I2 at two ends of the one-dimensional photo-sensitive light detector 18 into voltages V1 and V2, respectively. A subtraction circuit 32 subtracts the voltage V2 from the voltage V1 to generate a position signal. An analog-to-digital converter 33 converts an analog position signal into a digital position signal and outputs it to a controller 46. A differentiating circuit 34 differentiates the analog position signal to output a speed signal. An analog-to-digital converter 35 converts the analog speed signal into a digital speed signal and feeds it to the controller 46. A digital-to-analog converter 36 converts a digital drive signal from the controller 46 into an analog drive signal. A subtraction circuit 37 subtracts the analog drive signal from the analog position signal to generate an analog position error signal.

A phase compensator 38 advances the phase of a high-frequency component of the position error signal to make phase compensation. A first switch 39 connects the phase compensator 38 to a sum circuit 42 under control of the controller 46. A second switch 40 connects the differentiating circuit 34 to the sum circuit 42. A digital-to-analog converter 41 converts a digital drive signal from the controller 46 into an analog drive signal. The sum circuit 42 sums up the position error signal applied thereto through the first switch 39, the speed signal applied thereto through the second switch 40, and the drive signal from the DA converter 41. A VCM drive amplifier 43 drives the VCM coil 11b of the positioner 12 on the basis of the output of the sum circuit 42.

Figure 7:
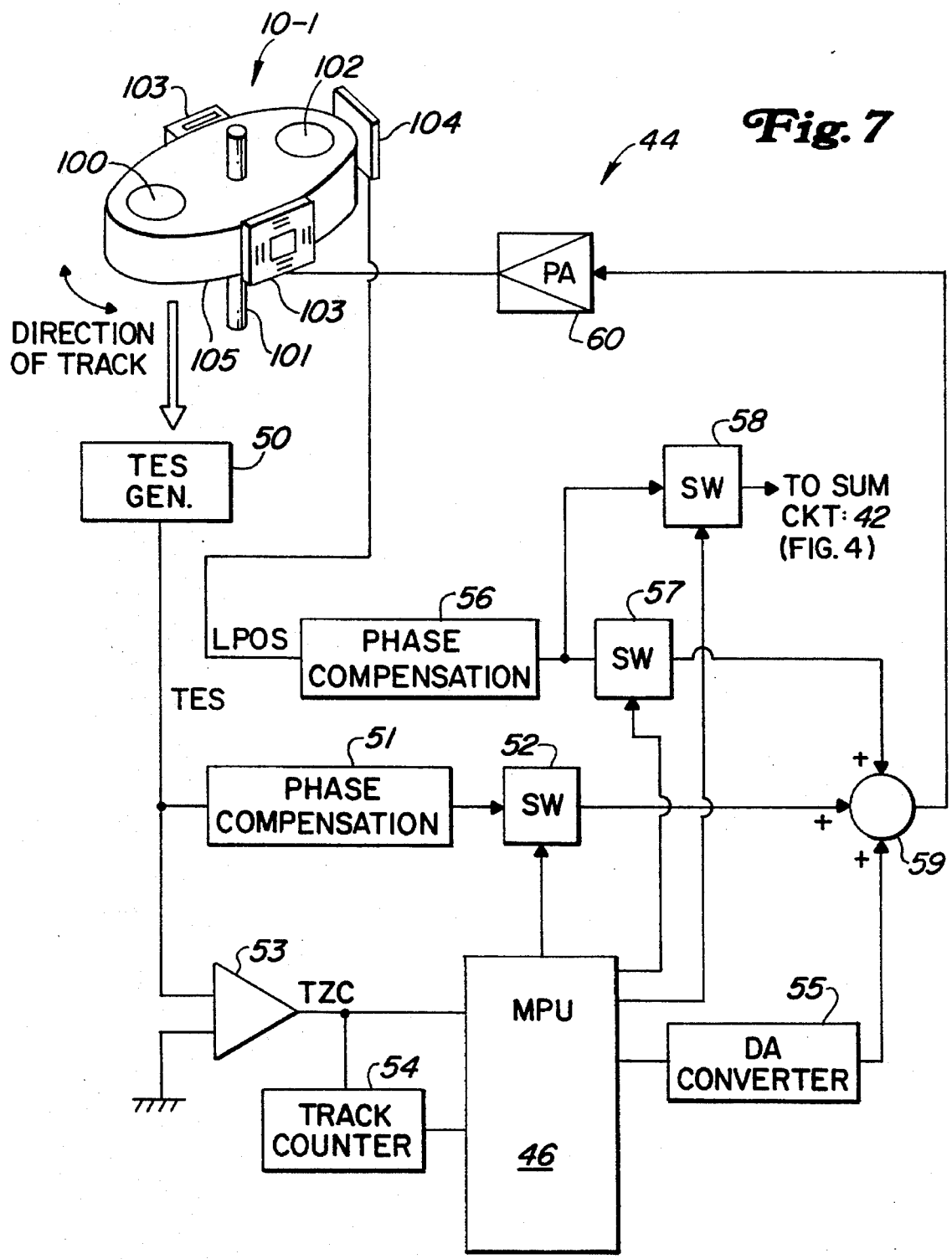
FIG. 7 is a block diagram of a track servo circuit in the seek control circuit shown in FIG. 6.

A track servo control circuit 44 detects a track error signal TES derived from the reflected light from the magneto-optical disk 20, which is received by the detector of the fixed head 10a, and it servo-controls the track actuator of the movable head 10b on the basis of the detected track error signal TES, as will be detailed in connection with FIG. 7. A focus servo control circuit 45 detects a focus error signal FEB derived from the reflected light from the magneto-optical disk 20, which is received by the detector of the fixed head 10a, and it servo-controls the focus actuator of the movable head 10b on the basis of the focus error signal FEB. The controller 46 comprises a microprocessor (MPU) and performs seek control and other control by execution of programs. A non-volatile memory 47 comprises an EEPROM (Electrically Erasable Programmable Read Only Memory) and stores parameters and other necessary data. A DC BUM circuit 48 sums up the detector outputs derived from the reflected light from the magneto-optical disk 20, which is received by the fixed head 10a, and outputs the readout signal to the controller 46.

In this embodiment, the VCM coil 11 can be driven by a combination of the position error signal, which is a difference between the drive signal from the controller (hereinafter referred to as "processor") 46 and the position signal, the speed signal, and the drive signal from the processor 46.

The track servo control circuit will be explained below with reference to FIG. 7. The heads 10-1 and 10-2 of the movable head 10b each have an objective lens 100 provided at one end of a head 105 rotatable about a rotating shaft 101, and a counterweight 102 at the other end of the head 105. In addition, a track actuator coil 103 is provided on the side of the head 105. A lens position detector 104 for detecting the lens position is provided in opposing relation to the head 105.

A track error signal generator 50 generates a track error signal TES from the detector output derived from the reflected light from magneto-optical disk 20, which is received through the objective lens 100. A phase compensator 51 advances the phase of a high-frequency component of the track error signal TES to make phase compensation. A third switch 52 turns on in response to a track servo ON signal from the processor 46 to form a track servo loop. A comparator 53 level-slices the track error signal TES to generate a track zero crossing signal TZC. A track counter 54 is set with a number of tracks to be crossed by the processor 46, and it is decremented in response to the track zero crossing signal TZC to indicate the number of tracks remaining. A DA converter 55 converts a digital speed signal from the processor 46 into an analog speed signal.

A phase compensator 56 advances the phase of a high-frequency component of a lens position signal LPOB from the lens position detector 104 to make phase compensation. A fourth switch 57 turns on in response to a lens lock signal from the processor 46 to form a lens lock servo loop. A fifth switch 58 outputs the lens position signal LPOS from the phase compensator 56 to the sum circuit 42, shown in FIG. 6, to drive the VCM coil 11*b*. A sum circuit 59 sums up the track error signal TES from the third switch 52, the lens position signal LPOB from the fourth switch 57, and the speed signal from the DA converter 55. A power amplifier 60 drives the track actuator coil 103 on the basis of the output of the sum circuit 59.

Next, seek processing that is executed by using the one-dimensional photo-sensitive light detector 18 will be explained. FIG. 8 is a flowchart showing seek processing in which seek is effected in one process. This seek processing is employed, for example, when the optical head is to be moved to the home position during initial processing. FIG. 9 is a flowchart showing seek processing in which seek is executed with the position of the optical head being confirmed. This seek processing is employed, for example, when the optical head is to be moved to the PEP zone.

First, the seek operation shown in FIG. 8 will be explained with reference to FIG. 6.

Step 8-1

Figure 10A:
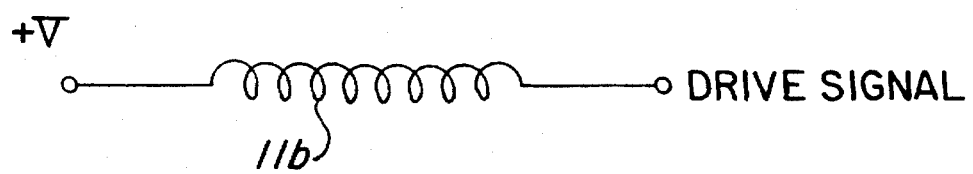
FIG. 10(a & b) shows a VEM motor drive operation in the seek processing shown in FIGS. 8 and 9.

Prior to starting of seek, the processor 46 turns off the first and second switches 39 and 40 and outputs a center value of "80 H" to the DA converter 41 to drive the VCM coil 11*b* through the sum circuit 42 and the VCM drive amplifier 43 so as to maintain the positioner 12 in a free state. As shown in FIG. 10A, the VCM coil 11*b* has a supply voltage of +V applied to one end thereof. Therefore, if +V is applied as a drive signal to the other end of the VCM coil 11*b*, no current flows through the VCM coil 11*b*. Consequently, the positioner 12 is brought into a free state where it is not moved either inwardly or outwardly. A digital drive signal value that is equivalent to the voltage of +V is "80 H".

Step 8-2

Next, the processor 46 calculates an output value X for a target position r, and outputs the drive signal X to the DA converter 36, and then turns on the first switch 39. Consequently, the subtraction circuit 37 generates a position error signal representative of a difference between the position signal from the one-dimensional photo-sensitive light detector 18 and the drive signal X from the DA converter 36. The position error signal is applied to the VCM coil 11*b* through the phase compensator 38, the first switch 39, the sum circuit 42 and the VCM drive amplifier 43, causing the positioner 12 to move for seek.

Step 8-3

When the position error signal becomes zero, it is decided that the positioner 12 has been positioned at the target position. At this time, the speed becomes zero. The processor 46 monitors the speed signal from the AD converter 35. When the speed signal becomes zero, the processor 46 decides that the seek has been completed, and terminates the seek operation.

Next, the seek operation shown in FIG. 9 will be explained.

Step 9-4

Prior to starting of seek, the processor 46 turns off the first and second switches 39 and 40 and outputs a center value of "80 H" to the DA converter 41 to drive the VCM coil 11*b* through the sum circuit 42 and the VCM drive amplifier 43 so as to maintain the positioner 12 in a free state.

Step 9-5

The processor 46 reads the position signal from the AD converter 33 to confirm the present position of the positioner 12. The processor 46 calculates an output value for the present position to lock the positioner 12 at the present position confirmed. Then, the processor 46 outputs the calculated value to the DA converter 36 and turns on the first switch 39. With the output of the DA converter 36, the VCM coil 11*b* is driven through the sum circuit 42 and the VCM drive amplifier 43 to lock the positioner 12 at the present position.

Step 9-6

Figure 10B:
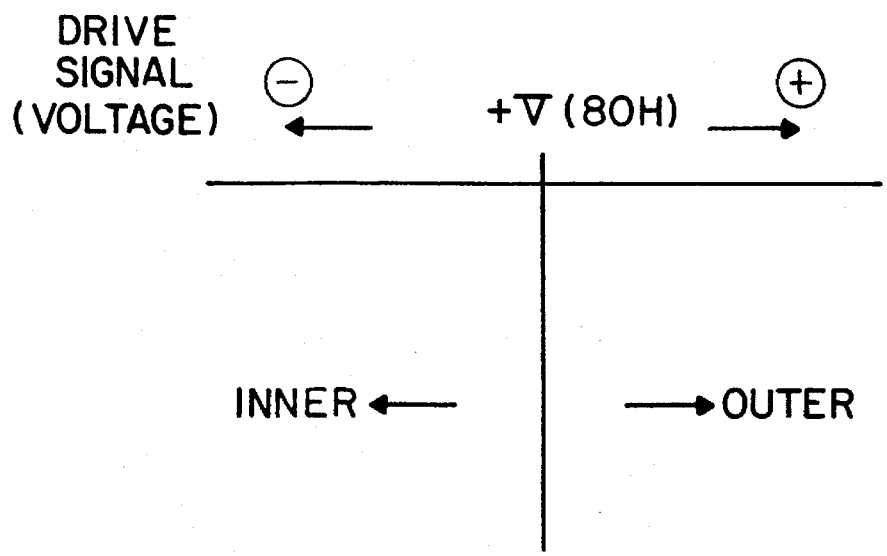

If the target position is at the outer side, the processor 46 increments the above-described output value by 1, whereas, if the target position is at the inner side, the processor 46 decrements the output value by 1. Then, the processor 46 outputs the resulting output value to the DA converter 36. With the output of the DA converter 36, the VCM coil 11*b* is driven through the sum circuit 42 and the VCM drive amplifier 43 to move the positioner 12 one step. That is, as shown in FIG. 10B, when the drive signal applied to the VCM coil 11*b* is +V ("80 H"), the positioner 12 is free. If the drive signal is increased in the + direction, the positioner 12 moves toward the outer side of the magneto-optical disk 20, whereas, if the drive signal is increased in the − direction, the positioner 12 moves toward the inner side of the magneto-optical disk 20.

Step 9-7

When the position error signal becomes zero, it is decided that the positioner 12 has been positioned at the target position. At this time, the speed becomes zero. The processor 46 monitors the speed signal from the AD converter 35. When the speed signal becomes zero, the processor 46 reads the present position from the AD converter 33 to decide whether or not the present position read is coincident with the target position. If NO, the process returns to Step 9-6. If the present position read is the target position, the process is terminated.

This seek operation is effectively employed for the following seek operations rather than an ordinary seek operation for moving the optical head 10 to the user zone: a GO HOME seek operation for moving the positioner 12, together with the optical head 10, to the inner stopper 13; a seek operation for moving the optical head 10 to a mirror zone of the medium for the adjustment of emission of the laser diode of the optical head 10; a seek operation for moving the optical head 10 to the PEP zone to read data from it; etc. The ordinary seek operation for moving the optical head 10 to a track in the user zone is effected by detecting a specified position on the basis of the count of pulses of the track error signal TES.

Figure 12:
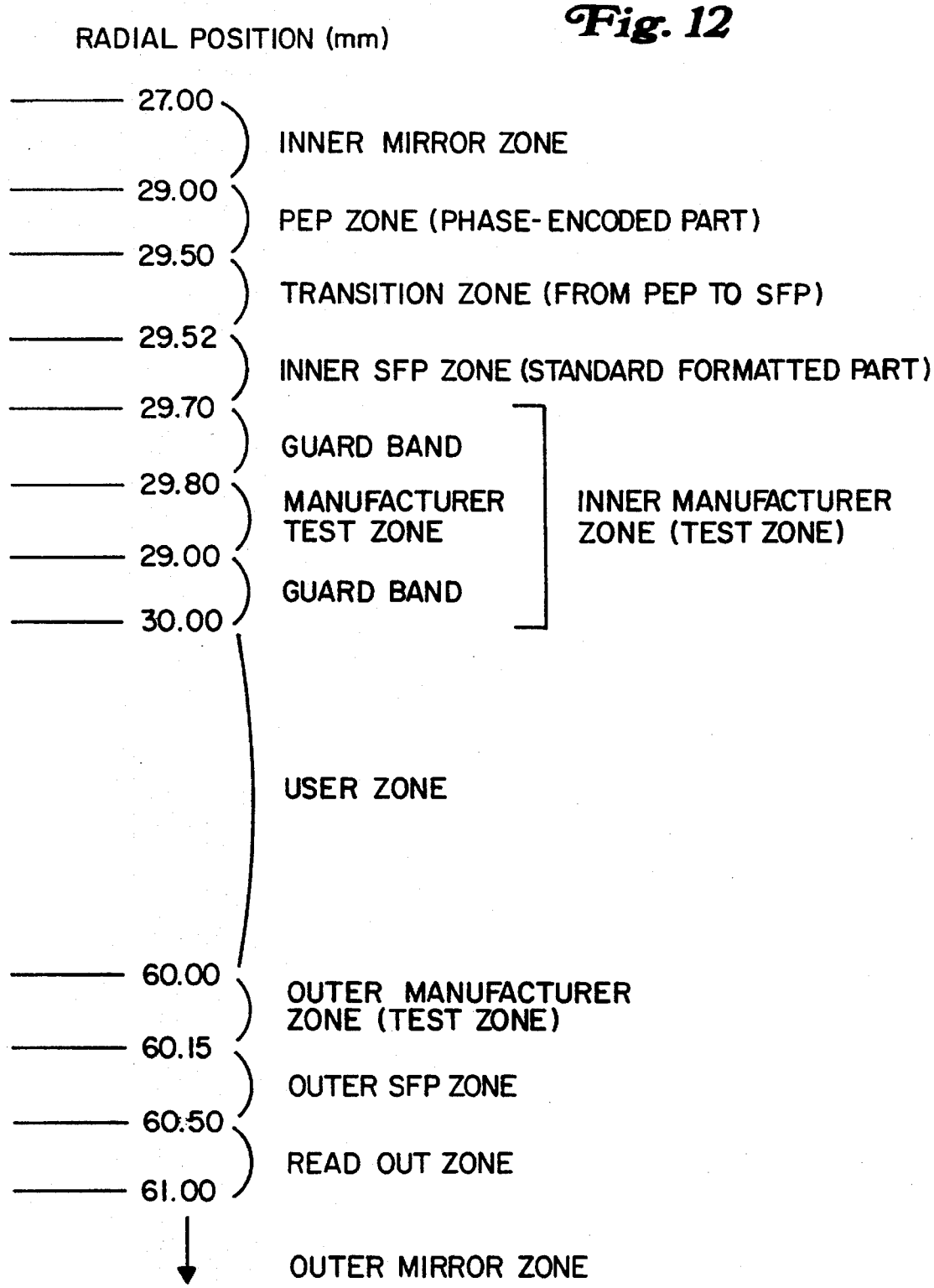
FIG. 12 shows a zone layout on an optical disk for the processing shown in FIG. 11.

As shown in FIG. 12, a 5-inch optical disk medium based on ISO has a zone layout in which various zones are arranged in the following order from the inner side toward the outer side: an inner mirror zone; a PEP (Phase-Encoded Part) zone containing the record of information on the kind of the medium concerned (i.e., the number of sectors per track; the byte count in one sector; magneto-optical disk or write-once optical disk; the reflectivity of the recording film; write data on land method or write data on groove method; etc.); a transition (from PEP to SFP) zone; an inner SFP (Standard Formatted Part) zone containing the record of detailed information (i.e., light power for each system; pulse width; etc.), an inner manufacturer zone (including a guard band, a manufacturer test zone, and a guard band); a user zone; an outer manufacturer zone; an outer SFP zone; a readout zone; and an outer mirror zone. Among these zones, the area ranging from the transition zone to the outer SFP zone on the optical disk is provided with grooves.

The above-described seek operation, which is based on the absolute position detected by using the one-dimensional photo-sensitive light detector 18, is executed for the seek to a zone other than the user zone in the above-described zone layout.

Figure 11:
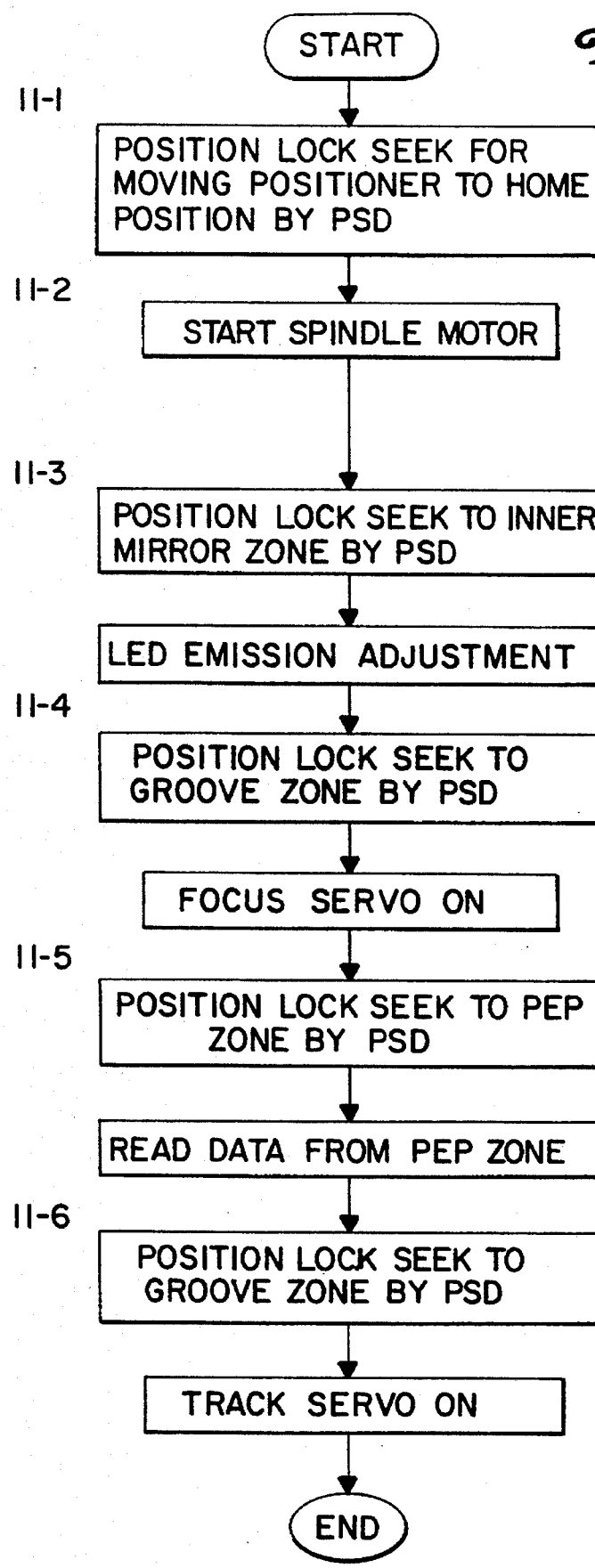
FIG. 11 is a flowchart showing initial processing in which the seek processing shown in FIG. 8 or 9 is executed.

The seek operation is executed as initial processing each time an optical disk cartridge 2 is inserted because optical disk cartridges 2 vary in characteristics. For example, when an optical disk cartridge 2 is loaded into the magneto-optical disk drive 1 and chucking is completed, a start command is issued from an upper-level controller to start the initial processing shown in FIG. 11.

Step 11-1

The processor 46 moves the positioner 12 to the home position where it abuts on the inner stopper 12. That is, the processor 46 turns off the first and second switches 39 and 40 and outputs "80 H" (the above-described center value)—" 8 H" to the DA converter 41, thereby driving the VCM coil 11b through the sum circuit 42 and the VCM drive amplifier 43 to move the positioner 12 toward the inner side. Consequently, a position signal is generated from the subtraction circuit 32 on the basis of the output of the photo-sensitive light detector 18, and a speed signal is obtained from the differentiating circuit 34.

Since this drive is effected through an open loop, the positioner 12 continues to move and mechanically stops when abutting on the inner stopper 13 at the inner side. The processor 46 monitors the speed output from the AD converter 35 to decide whether or not the speed is zero. If the speed is zero, it is decided that the positioner 12 has stopped in abutment on the inner stopper 13.

This mechanical position of the inner stopper 13 is the home position. The processor 46 reads the position signal obtained from the output of the one-dimensional photo-sensitive light detector 18 at this time and stores the inner limit position in the memory. The inner limit position is used as a reference position, and it is also useful to prevent occurrence of a seek operation beyond the inner limit position.

Since the optical head 10 emits no light at this time, a position signal can be obtained from the photo-sensitive light detector 18 by emission of light from the LED 17. Accordingly, the seek operation based on the absolute position can be effected even when the optical head 10 emits no light.

Step 11-2

After the seek operation of moving the positioner 12 to the home position, the processor 46 starts rotation of the spindle motor 15. Consequently, the magneto-optical disk 20 in the optical disk cartridge 2 loaded in the magneto-optical disk drive 1 starts rotating.

Step 11-3

Next, the emission of light from the optical head 10 is adjusted. For this purpose, the processor 46 outputs to the DA converter 36 a drive value corresponding to the position of the inner mirror zone, which is known, as shown in FIG. 12, thereby moving the positioner 12 to the inner mirror zone by the above-described seek processing, shown in FIG. 8.

Further, the processor 46 causes each laser diode of the optical head 10 to emit light and allows the detector to receive the reflected light from the mirror zone of the magneto-optical disk 20. The processor 46 determines a drive output for each laser diode on the basis of the quantity of light received so that the quantity of light emitted from the laser is equal to the specified value, thereby completing the emission adjustment.

At this time also, the optical head 10 emits no light during the seek operation for moving the positioner 12 to the inner mirror zone. Therefore, a position signal can be obtained from the photo-sensitive light detector 18 by the emission of light from the LED 17. Accordingly, the seek operation based on the absolute position can be effected even when the optical head 10 emits no light.

Step 11-4

Next, in order to turn on the focus servo, the processor 46 moves the positioner 12 to any groove zone in the area ranging from the PEP zone to the outer SFP zone by the seek processing shown in FIG. 8. Thus, reflected light from a groove is obtained, and the focus servo is turned on.

Step 11-5

Next, in order to read the contents of the PEP zone, the processor 46 moves the positioner 12 to the PEP zone by the seek processing shown in FIG. 8. Then, the processor 46 reads the contents of the PEP zone (e.g., the number of sectors per track, the byte counter per sector, etc.).

Step 11-6

Next, in order to turn on the track servo, the processor 46 moves the positioner 12 to any groove zone in the area ranging from the PEP zone to the outer SFP zone by the seek processing shown in FIG. 8. Thus, reflected light from a groove is obtained, and the track servo is turned on. Then, the processor 46 terminates the initial processing and waits for a command from the upper-level controller.

Thus, in this embodiment, the light-emitting device 17 is independently provided on the positioner 12, and the photo-sensitive light detector 18 generates an output corresponding to the position of the positioner 12 on the basis of the light emitted from the light-emitting device 17. Therefore, an accurate position signal can be obtained even when the optical head 10 emits no light. In addition, even when there is fluctuation in the quantity of reflected light derived from the illuminating light from the optical head 10, the position detection sensitivity will not lower. Since seek is effected on the basis of the position signal and the speed signal obtained therefrom, it is possible to realize an accurate and high-speed seek operation based on the absolute position.

The following is a description of one embodiment in which the position detected by the photo-sensitive light detector 18 is used for an ordinary track access operation.

Figure 13:
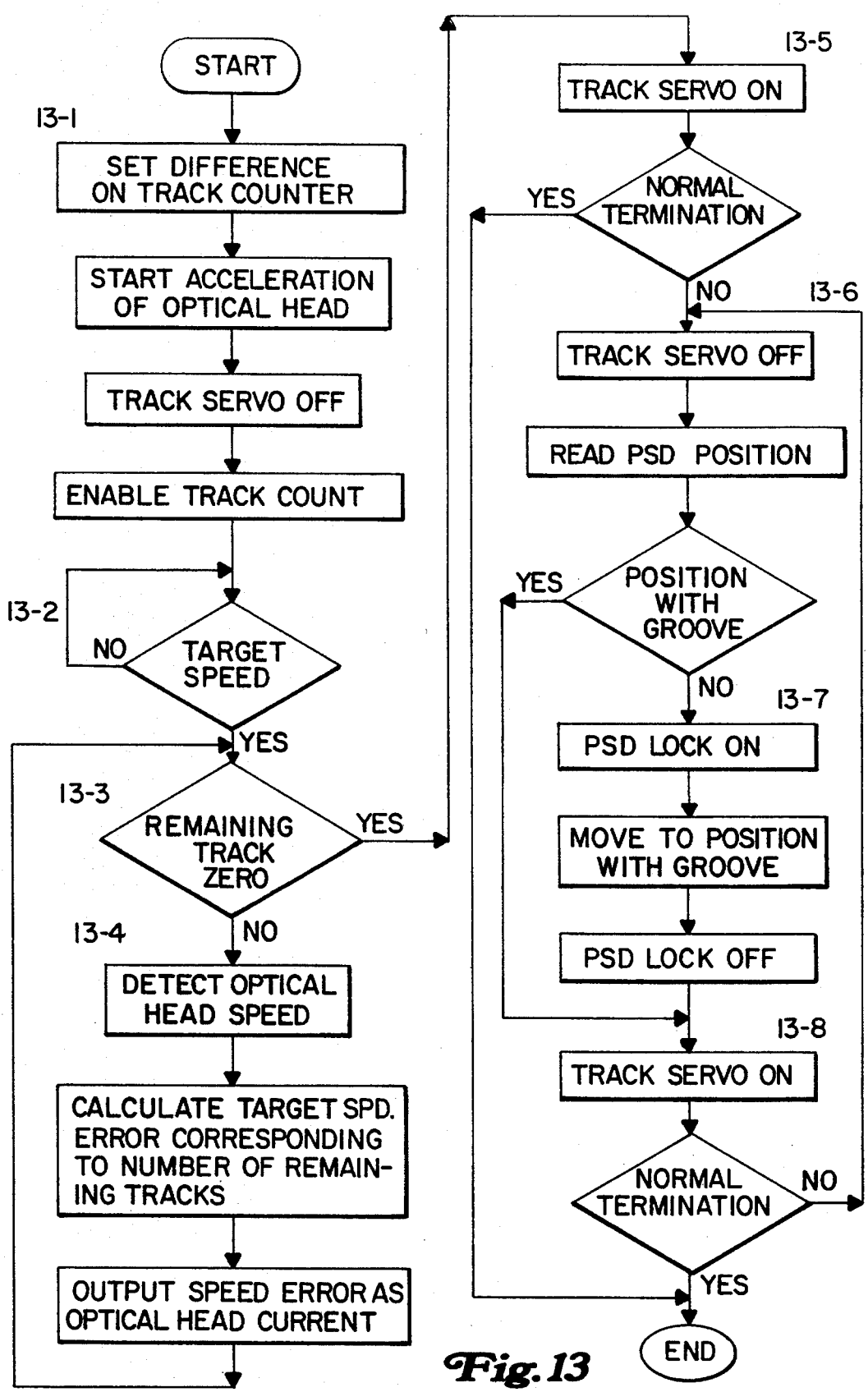
FIG. 13 is a flowchart showing seek processing according a third embodiment of the present invention.

FIG. 13 is a flowchart showing processing according to a second embodiment of the present invention, and FIG. 14 is a view for explanation of the second embodiment of the present invention.

First, the reason for providing this embodiment will be explained. Tracks on the magneto-optical disk 20 are not formed over the entire movable range of the optical head 10, as described above. That is, a mirror zone where no groove is cut is provided at each extremity of the movable range of the optical head 10, and no track error signal can be obtained at this zone. In general, the track error signal TES is generated in the track error signal generator 50 (see FIG. 7) by a push-pull method in which intensities of two first-order rays of light diffracted by a groove are detected by a two-split detector.

Figure 14A:
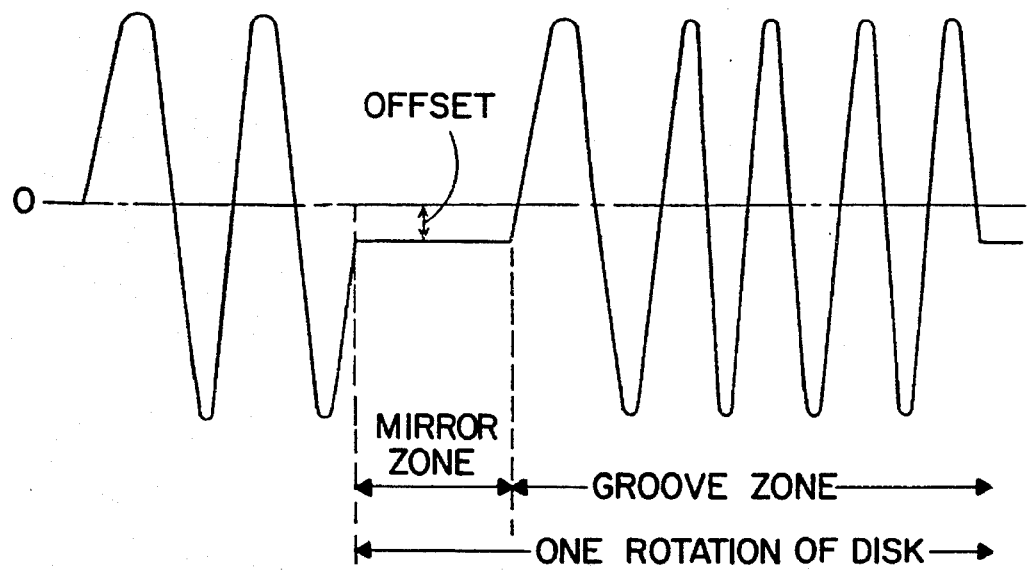
FIG. 14(a & b) shows an operation for the seek processing shown in FIG. 13.

The track error signal TES may be offset owing to a plurality of factors, for example, the position where the two-split detector is mounted, the inclination of the medium 20 relative to the horizontal plane, the inclination of the optical axis, the offset of return light from the position of the detector due to the offset of the optical axis, etc. However, it is rather rare that the track error signal TES becomes zero at the mirror zone even if the system is adjusted so that the offset of the track error signal TES becomes zero. Consequently, an offset is generated at the boundary between the groove zone and the mirror zone, as shown in FIG. 14(A). The reason why the track error signal TES varies cyclically at the groove zone of the medium 20 is that even if the optical head 10 is fixed, the tracks move as the medium 20 rotates because of the track eccentricity of the medium 20. Therefore, an offset alone is generated at the mirror zone because no groove is provided therein.

In the magneto-optical disk drive, the optical head 10 cannot always be positioned to the target track by a single seek operation. In particular, when the medium 20 has dust attached thereto or strong vibration is externally applied to the disk drive, two or more seek operations may be needed to position the optical head 10 to the target track. For example, the optical head 10 is moved to a position near the target track by a first seek operation, and then it is moved to the target track by a second seek operation.

Further, if an off-track is detected during a seek operation when the track servo is on, the track error signal TES will not converge. Therefore, in such a case, the track servo is once turned off and then turned on again. When such a retry of turning on the track servo is carried out, the position control of the optical head 10 by the positioner 12 is temporarily suspended. At this time, the positioner 12 may be moved by the offset of the circuit or the tension of the positioner cable.

In such a case, if the target track is located in the vicinity of the innermost or outermost position, the optical head 10 may readily enter the mirror zone. In general, the accessible track range (user zone) is distant from a mirror zone by about 1 mm (several hundreds of tracks). However, it can happen that the optical head 10 enters the mirror zone to cause the track servo to be turned on, although such an incident seldom occurs.

In the meantime, the objective lens 100 of the optical head 10 is allowed to follow tracks on the medium 20 rotating at high speed by the operation of the track actuator 103. The track actuator 103 is combined with a magnetic circuit provided in the optical head 10 to make the objective lens 100 follow tracks.

The accelerating power of the track actuator 103 is designed to be a considerably large value in order that the optical head 10 is decelerated all at once when the track servo is turned on during the lens seek operation. For example, with an-ordinary track eccentricity, the average current flowing during the track following is 100 mA or less, whereas, when the track servo is turned on during the seek operation, a current as large as 1.5 A flows, although it is momentary (100 microsec.).

If such a large current flows for a long time (several seconds), the actuator coil 103 will burn out by heat generated from itself. If an actuator protecting circuit, which monitors the current flowing through the actuator and cuts off the drive of the actuator when a large current flows for a long time, is provided, burnout of the coil can be prevented. However, the circuit is complicated, and it is not preferable that such a protecting function act in ordinary use. Once the protecting function acts, the system becomes incapable of being used and necessary to repair.

When the track servo is turned on at either of the mirror zones, an offset appears in the track error signal TES, as described above, and causes a current to flow through the track actuator 103 so as to cancel the offset of the track error signal TES. However, since the mirror zone has no track, the track error signal TES remains as it is wherever the track actuator 103 lies.

For this reason, a current much larger than in the normal track following flows through the track actuator 103 for a long time due to the offset of the track error signal TES, which may lead to burnout of the coil.

To prevent such a problem, in this embodiment the absolute position of the positioner 12 is detected with the photo-sensitive light detector 18, and when the positioner 12 is at either of the mirror zones, the positioner 12 is moved to a zone having grooves, and then the track servo is turned on. The embodiment will be explained below more specifically with reference to FIG. 13.

The embodiment will be explained below by way of an example of a lens seek operation in which the objective lens 100 is moved over the surface of a medium having less than several hundreds of tracks.

Step 13-1

The processor 46 sets an amount of movement (difference) on the track counter 54. Next, the processor 46 outputs an acceleration signal to the DA converter 55 (when the number of tracks is less than several hundreds) for lens seek, and turns off the third switch 52 to turn off the track servo, and then enables the track counter 54. Consequently, the objective lens 100 of the optical head 10 moves in the track direction for seek, and the track counter 54 decrements the count value of track zero crossing signals TZC derived from the track error signal TES and indicates the number of tracks remaining.

Step 13-2

The processor 46 obtains an actual speed from the interval of the track zero crossing signals TZC to decide whether or not the target speed has been reached.

Step 13-3

When deciding that the target speed has been reached, the processor 46 reads the track counter 54 to decide whether or not the number of tracks remaining is zero. If YES, the processor 46 proceeds to Step 13-5.

Step 13-4

If the number of tracks remaining is not zero, the processor 46 detects an actual speed from the track zero crossing signals TZC to calculate a target speed corresponding to the number of tracks remaining, and obtains a speed error, that is, a difference between the actual speed and the target speed calculated. Then, the processor 46 outputs the speed error signal to the DA converter 55 to drive the optical head 10, and then returns to Step 13-3.

Step 13-5

When the number of tracks remaining reaches zero, the processor 46 turns on the third switch 52 to turn on the track servo. Then, the processor 46 checks whether or not off-track has occurred by checking track error signal TES. If no off-track has occurred, the process is brought to a normal termination.

Step 13-6

If it is decided that off-track has occurred, the processor 46 turns off the third switch 52 to turn off the track servo. Then, the processor 46 reads the position signal of the photo-sensitive light detector 18 from the AD converter 33, shown in FIG. 6, to decide whether or not the optical head 10 is positioned where grooves are present. If YES, the processor 46 proceeds to Step 13-8.

Step 13-7

If it is decided that the optical head 10 is not positioned where grooves are present, the processor 46 turns on the first switch 39, shown in FIG. 6, to lock the position of the positioner 12. Then, the processor 46 sets a value for movement (i.e., in the outward direction in the case of the inner mirror zone; in the inward direction in the case of the outer mirror zone) on the DA converter 36, and moves the positioner 12 to where grooves are present. Then, the processor 46 turns off the first switch 39 to cancel the position lock of the positioner 12.

Step 13-8

The processor 46 turns on the third switch 52 to turn on the track servo. Then, the processor 46 checks whether or not off-track has occurred. If NO, the processor 46 decides whether or not on-track has been made to the desired track. If NO, the process returns to Step 13-6. If on-track has been made to the desired track, the process is terminated.

Figure 14B:
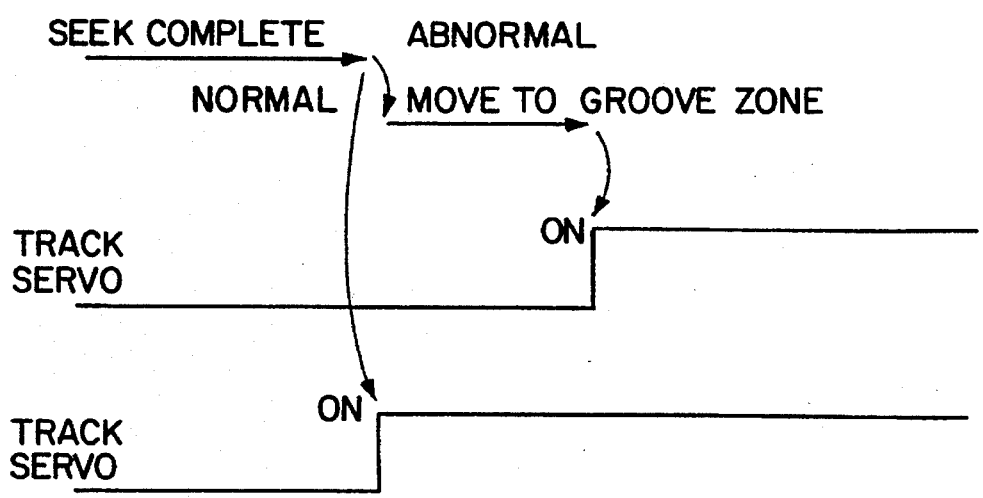

Thus, after the completion of a seek operation effected by using the track error signal TES, the position of the positioner 12 is checked to decide whether or not the positioner 12 is in a mirror zone, as shown in FIG. 14(B). If the positioner 12 is in a mirror zone, it is then moved to where grooves are present. Thereafter, the track servo is turned on. Therefore, it is possible to prevent the track servo from being kept on for a long time at the mirror zone, and hence possible to prevent burnout of the track actuator.

Although the foregoing description has been made with respect to a magneto-optical disk drive unit, the described system may also be applied to optical disk drive units, optical card readers, etc. In addition, a position error signal may also be used for an ordinary seek operation for moving the optical head to the user zone. Further, the light-emitting device 17 may be provided on the movable head 10b instead of the positioner 12.

Thus, since the light-emitting device 17, which applies light to the photo-sensitive light detector 18, is provided on the positioner 12 or the optical head 10, it is possible to realize a seek operation when the optical head 10 is in an inoperative state, e.g., a seek operation for the emission adjustment, a seek operation for moving the positioner 12 to the home position, a seek operation for moving the positioner 12 to the PEP zone when an optical disk is set, etc. In addition, an adequate quantity of light can be applied to the photo-sensitive light detector 18, and there is no fluctuation in the quantity of light. Accordingly, the position detection accuracy improves, and an accurate seek operation can be realized.

In the above-described seek control, which is based on the absolute position, the positioner 12 is driven on the basis of the difference between the drive signal for the target position and the detection output of the photo-sensitive light detector 18. Therefore, the drive signal must correspond to the target absolute position, and it is necessary to obtain the relationship between the absolute position, the detection output and the drive signal in advance. This relationship can be obtained by calculation from design values, and it has heretofore been determined on the basis of the design values of the circuit.

With the conventional method, however, since there are variations among drive units, that is, variations in characteristics of circuits, e.g., photo-sensitive light detector, I-V converter, AD converter, etc. and mechanical variations, for example, variation in the position where the photo-sensitive light detector is secured, it is impossible to obtain an accurate relationship from the design values, and an accurate positioning operation cannot be realized. In particular, when positioning of the micron order is required as in the case of optical disks, even slight variation in the above-described circuit characteristics or mechanical factors makes it impossible to realize accurate positioning.

Accordingly, in, the present invention, the relationship in characteristics between the absolute position, the detection output and the drive signal is measured, and coefficients expressing the relation are obtained.

Figure 15:
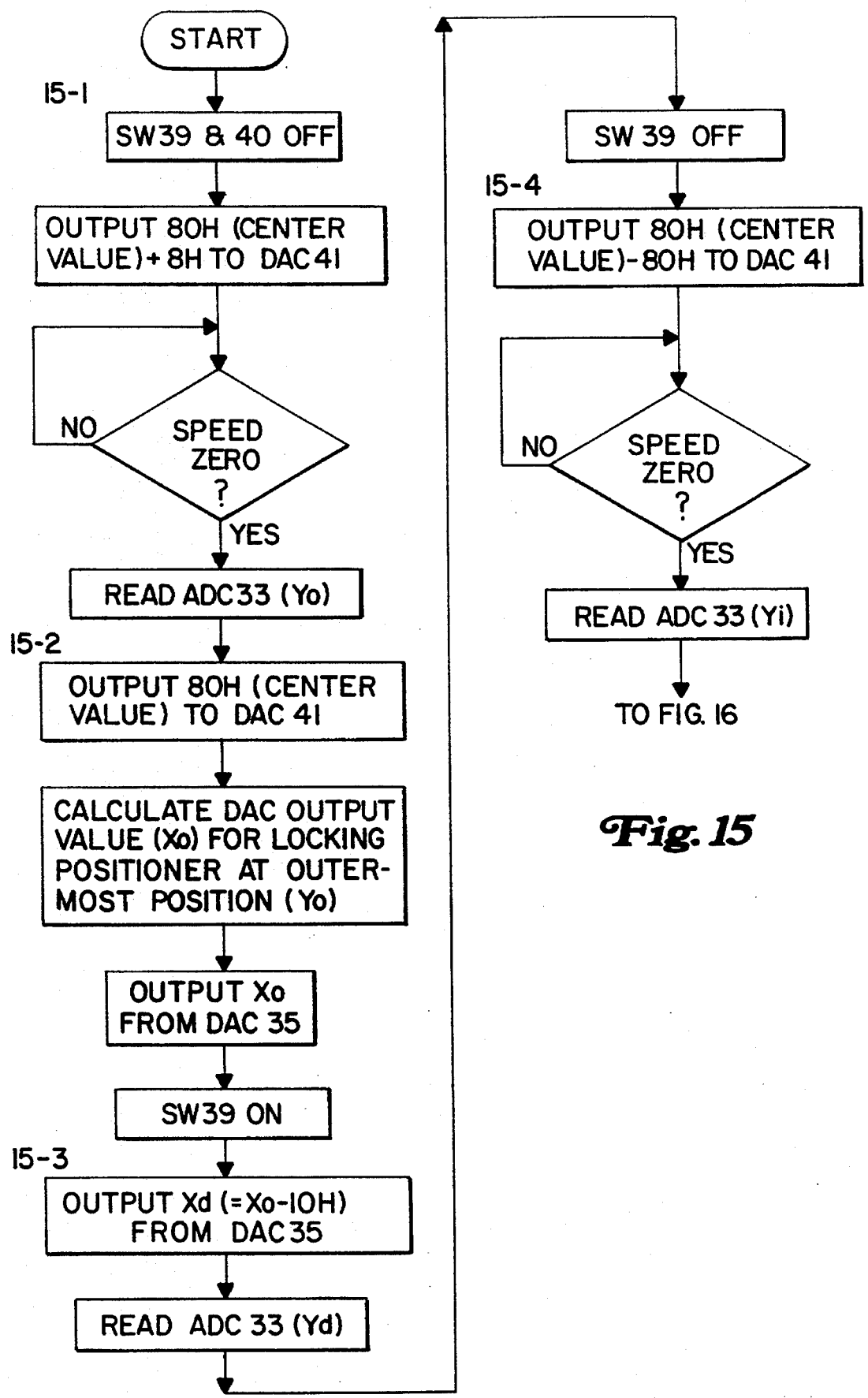
FIG. 15 is a portion of a flowchart (part 1) showing conversion characteristic measuring processing according to the present invention.
Figure 16:
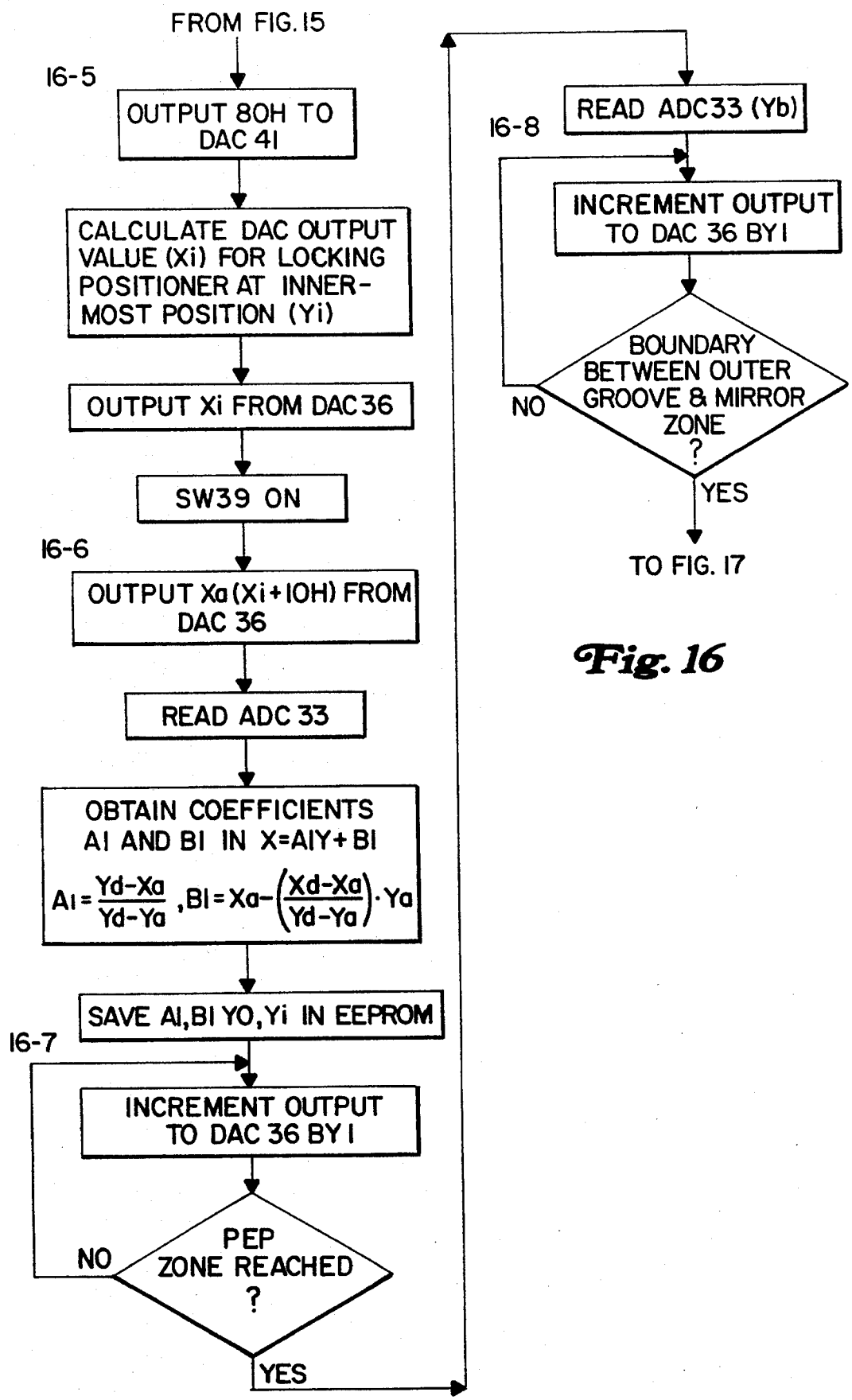
FIG. 16 is a continuation of the flowchart shown in FIG. 15 (part 2) showing conversion characteristic measuring processing according to the present invention.
Figure 17:
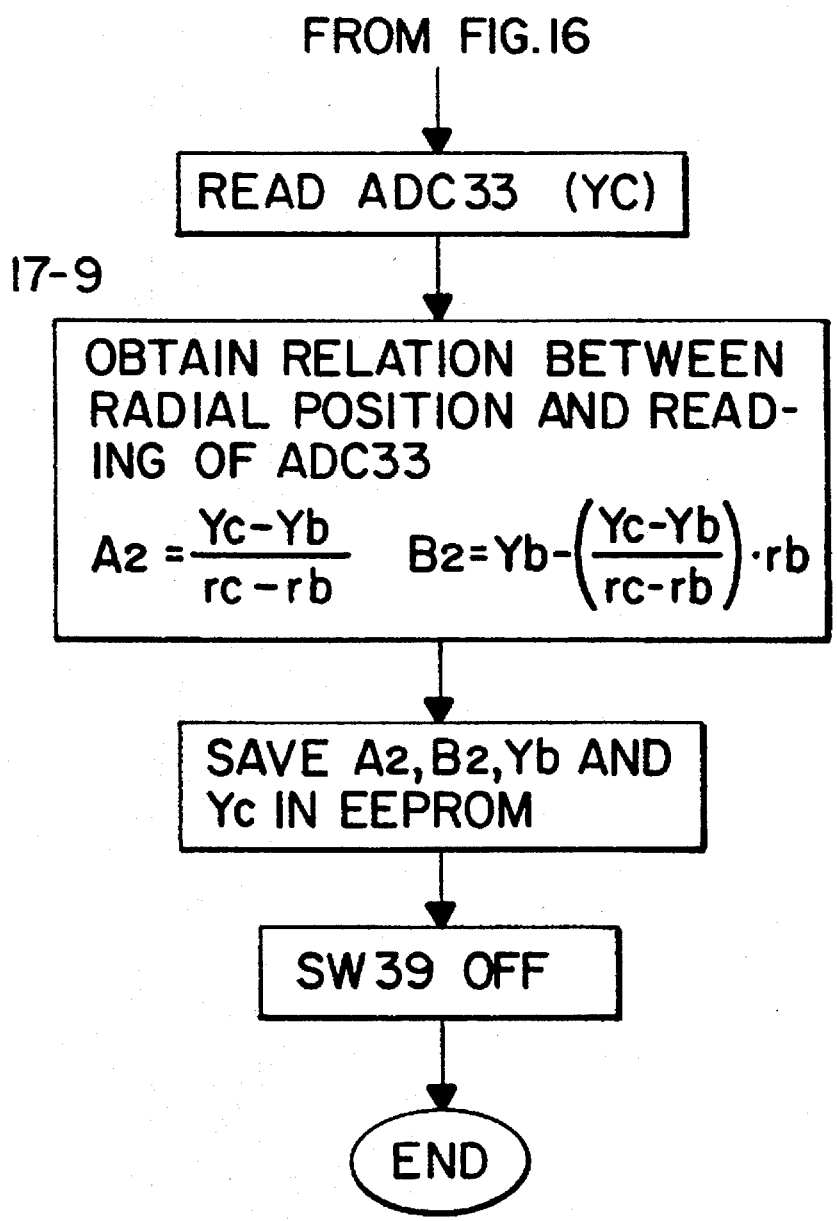
FIG. 17 is a continuation of the flowchart shown in FIG. 16 (part 3) showing conversion characteristic measuring processing according to the present invention.
Figure 18:
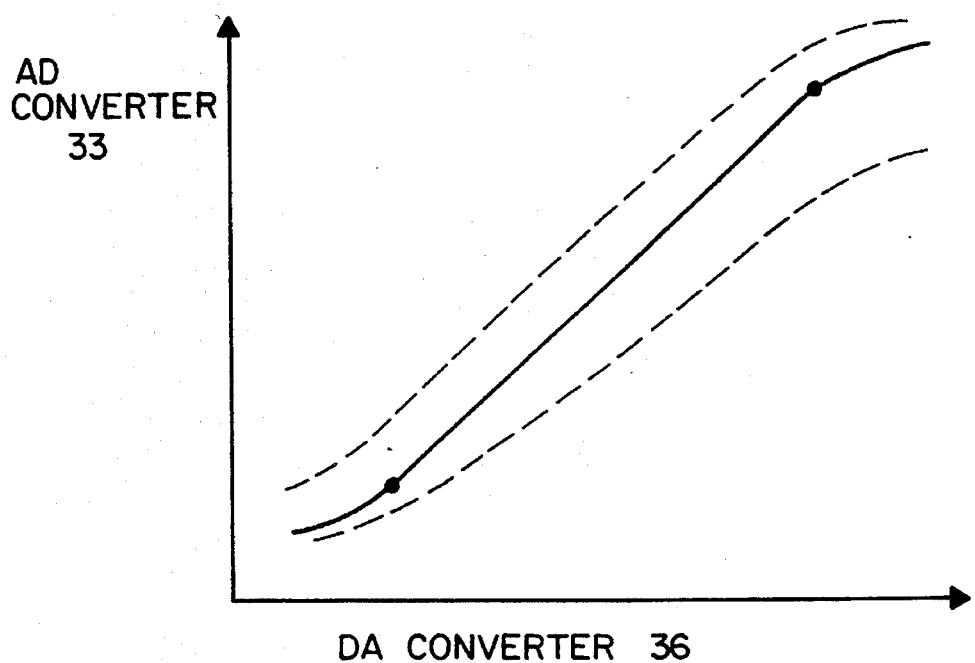
FIG. 18 is a graph showing seek characteristics obtained by a one-dimensional photo-sensitive detector.

FIGS. 15, 16 and 17 are flowcharts (part 1), (part 2) and (part 3), respectively, showing measuring processing according to one embodiment of the present invention.

Step 15-1

The measuring processing is executed during adjustment made at the firm. When the measuring processing is started, the processor 46 turns off the first and second switches 39 and 40 and outputs "80 H" (the above-described center value, with which the positioner 12 does not move either inwardly or outwardly) +"8 H" to the DA converter 41 to drive the VCM coil 11b through the sum circuit 42 and the VCM drive amplifier 43 so as to move the positioner 12 outwardly. Consequently, a position signal is generated from the subtraction circuit 32 on the basis of the output from the photo-sensitive light detector 18, and a speed signal is obtained from the differentiating circuit 34.

Figure 20:
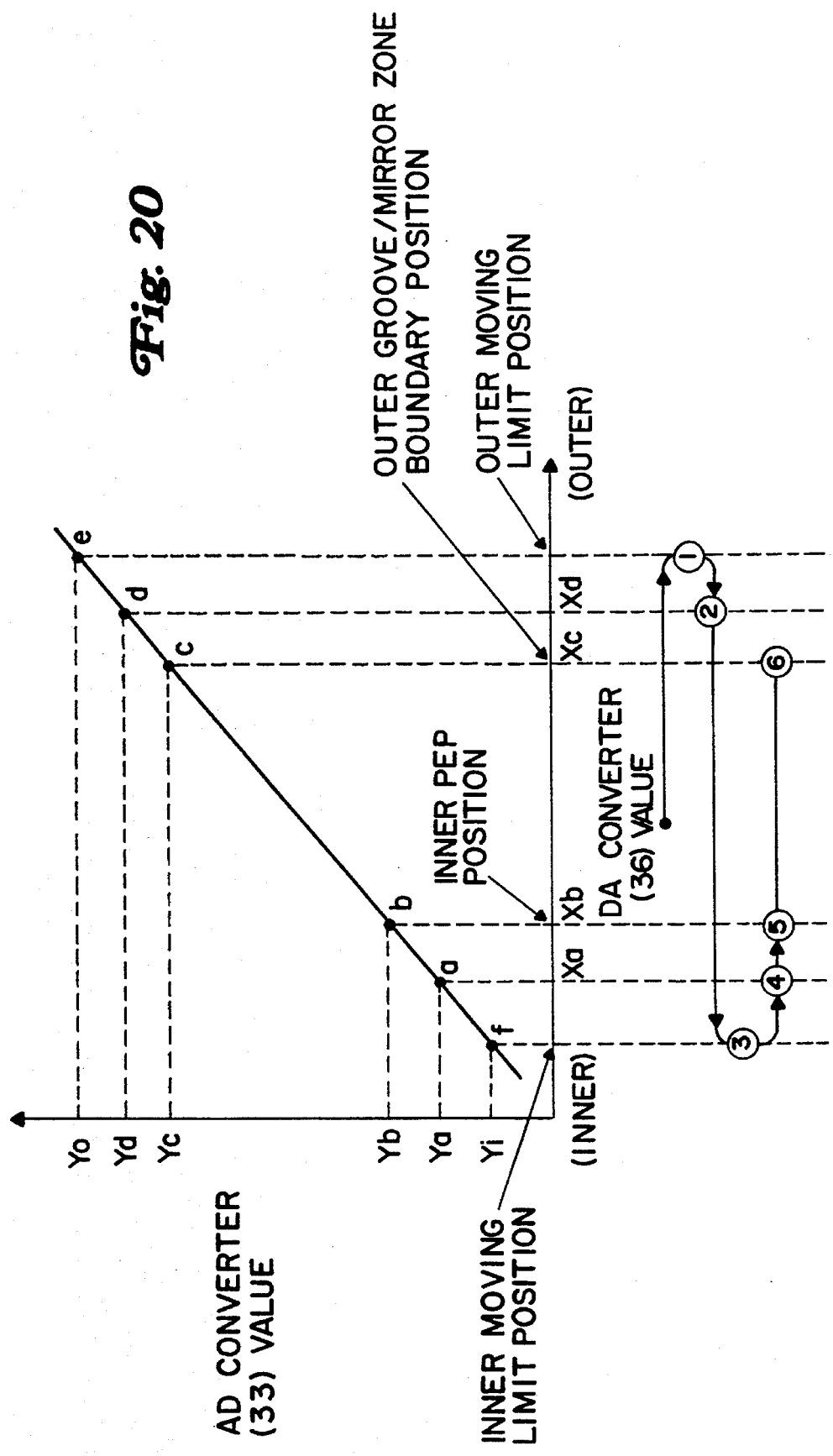
FIG. 20 shows an operation for the measuring processing shown in FIGS. 15 to 17.

Since this drive is effected through an open loop, the positioner 12 eventually abuts on the outer stopper 14 at the outer side and mechanically stops, as shown in FIG. 1. The processor 46 monitors the speed output from the AD converter 35 to decide whether or not the speed is zero. If the speed is zero, it is decided that the positioner 12 has stopped in abutment on the outer stopper 14. Since this position is the outer limit e of the movable range, as shown in FIG. 20, the processor 46 reads the position signal from the AD converter 33 and saves it as the outermost position Yo.

Step 15-2

Next, the processor 46 outputs "80 H" (center value, with which the positioner 12 does not move either inwardly or outwardly) to the DA converter 41 to drive the VCM coil 11b through the sum circuit 42 and the VCM drive amplifier 43 so as to set the positioner 12 free. The processor 46 calculates an output value (drive signal) X0 to be delivered to the DA converter 36 to lock the positioner 12 at the outermost position Yo from the design values. Then, the processor 46 outputs the calculated value to the DA converter 36 and turns on the first switch 39 to drive the VCM coil 11b through the sum circuit 42 and the VCM drive amplifier 43 so as to lock the positioner 12 at the outermost position.

Step 15-3

Next, to move the positioner 12 to the point d shown in FIG. 20, the processor 46 outputs Xd (="X0–10H") to the DA converter 36 to drive the VCM coil 11b through the sum circuit 42 and the VCM drive amplifier 43 so as to position the positioner 12 at the point d. Then, the processor 46 reads the position signal from the AD converter 33 and saves it as the position Yd of the point d. Thereafter, the processor 46 turns off the first switch 39 to cancel the position lock.

Step 15-4

Next, the processor 46 outputs "80 H" (center value)—"8 H" to the DA converter 41 to drive the VCM coil 11b through the sum circuit 42 and the VCM drive amplifier 43 so as to move the positioner 12 slowly toward the inner side. Consequently, a position signal is generated from the subtraction circuit 32 on the basis of the output from the photo-sensitive light detector 18, and a speed signal is obtained from the differentiating circuit 34.

Since this drive is effected through an open loop, the positioner 12 eventually abuts on the inner stopper 13 at the inner side and mechanically stops, as shown in FIG. 1. The processor 46 monitors the speed output from the AD converter 35 to decide whether or not the speed is zero. If the speed is zero, it is decided that the positioner 12 has stopped in abutment on the inner stopper 13. Since this position is the inner limit f of the movable range, as shown in FIG. 20, the processor 46 reads the position signal from the AD converter 33 and saves it as the innermost position Yi.

Step 16-5

Shifting to Step 16-5 in FIG. 16, the processor 46 outputs "80 H" (center value) to the DA converter 41 to drive the VCM coil 11b through the sum circuit 42 and the VCM drive amplifier 43 so as to lock the positioner 12 from movement. Then, the processor 26 calculates an output value (drive signal) Xi to be delivered to the DA converter 36 to lock the positioner 12 at the innermost position Yi from the design values. Then, the processor 46 outputs the calculated value to the DA converter 36 and turns on the first switch 39 to drive the VCM coil 11b through the sum circuit 42 and the VCM drive amplifier 43 so as to lock the positioner 12 at the innermost position.

Step 16-6

Next, to move the positioner 12 to the point a shown in FIG. 20, the processor 46 outputs Xa (="Xi–10 H") to the DA converter 36 to drive the VCM coil 11b through the sum circuit 42 and the VCM drive amplifier 43 so as to position the positioner 12 at the point a. Then, the processor 46 reads the position signal from the AD converter 33 and saves it as the position Ya of the position a.

In this way, it is possible to measure the values (drive signals) of the DA converters 36 and the values (position detection outputs) of the AD converter 33 for two points a and d, which are predetermined distances from the outer and inner limits, respectively. Then, the processor 46 calculates coefficients of the following equation (1), which is the relational expression of the drive signal X to the DA converter 36 and the position detection output Y from the AD converter 33:

$$X = A1\ Y + B1 \tag{1}$$

The coefficients are calculated from the following equations:

$$A1 = (Xd - Xa)/(Yd - Ya)$$

$$B1 = Xa - [(Xd - Xa)/(Yd - Ya)]\ Ya$$

Then, the processor 46 saves the coefficients A1 and B1, together with the outer and inner limit values Yo and Yi, in the non-volatile memory 47.

Step 16-7

Figure 19:
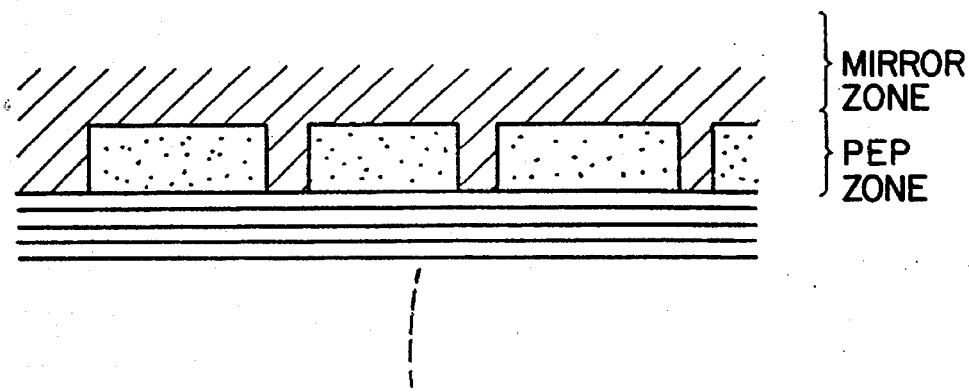
FIG. 19 shows a PEP zone on an optical disk medium.

Next, to move the positioner 12 to the point b in the PEP zone, shown in FIG. 12, the processor 46 increments the value (drive signal) to be output to the DA converter 36 by "1" and outputs the resulting output value (drive signal) to the DA converter 36 to drive the VCM coil 11b one step at a time through the sum circuit 42 and the VCM drive amplifier 43. Then, the processor 46 checks whether or not a pattern peculiar to the PEP zone appears from the signal read from the DC SUM circuit 48. As shown in FIG. 19, the PEP zone comprises mirror regions and data regions, which are arranged alternately. Accordingly, when a read signal corresponding to this pattern is generated, it can be decided that the positioner 12 has moved to the PEP zone.

When deciding that the positioner 12 has moved to the point b in the PEP zone, the processor 46 reads the position signal Yb from the AD converter 33 and saves it. At this time, the absolute position rb of the point b in the PEP zone is known, as shown in the radial layout in FIG. 12, and the drive signal value Xb output to the DA converter 36 is also known.

Step 16-8

Similarly, to move the positioner 12 to the point c at the boundary between the outer groove zone and the outer mirror zone, the processor 46 increments the output value (drive signal) to the DA converter 36 by "1" and outputs the resulting output value (drive signal) to the DA converter 36 to drive the VCM coil 11b one step at a time through the sum circuit 42 and the VCM drive amplifier 43. While doing so, the processor 46 checks whether or not the track error signal TES from the track servo control circuit 44 disappears.

As shown in FIG. 12, the outer mirror zone is next to the readout zone. Therefore, at the readout zone, the track error signal TES is generated, but, when the positioner 12 enters the mirror zone, no track error signal TES is generated any longer. Accordingly, when the track error signal TES disappears, it can be decided that the positioner 12 has moved to the point c at the boundary between the groove zone and the mirror zone. When deciding that the positioner 12 has moved to the boundary point c, the processor 46 reads the position signal Yc from the AD converter 33 and saves it. At this time, the absolute position rc of the boundary point c is known, as shown in the radial layout in FIG. 12, and the drive signal value Xc output to the DA converter 36 is also known.

Step 17-9

In this way, the positioner 12 is positioned at each of the two standard points whose absolute positions are known, and the absolute position r and the position signal Y from the AD converter 33 are measured. Then, the processor 46 calculates coefficients of the following equation (2), which is the relational expression of the absolute position r and the position detection output Y from the AD converter 33:

$$Y = A2\ r + B2 \tag{2}$$

The coefficients are calculated from the following equations:

$$A2 = (Yc - Yb)/(rc - rb)$$

$$B2 = Yb - [(Yc - Yb)/(rc - rb)]\ rb$$

Then, the processor 46 saves the coefficients A2 and B2, together with the values Yb and Yc of the AD converter 33 for the two standard points, in the non-volatile memory 47, and turns off the switch 39, thereby terminating the process.

Thus, it is possible to measure the relationship between the drive signal and the position signal, which varies among drive units, as shown in FIG. 19, that is, the relationship between the drive signal X output to the DA converter 36 and the position detection signal Y from the AD converter 33, and the relationship between the absolute position r and the position detection signal Y from the AD converter 33. Thus, it is possible to convert the position detection signal Y into the drive signal X for the absolute position r in conformity to the circuit and mechanical characteristics of the drive unit concerned.

Figure 21:
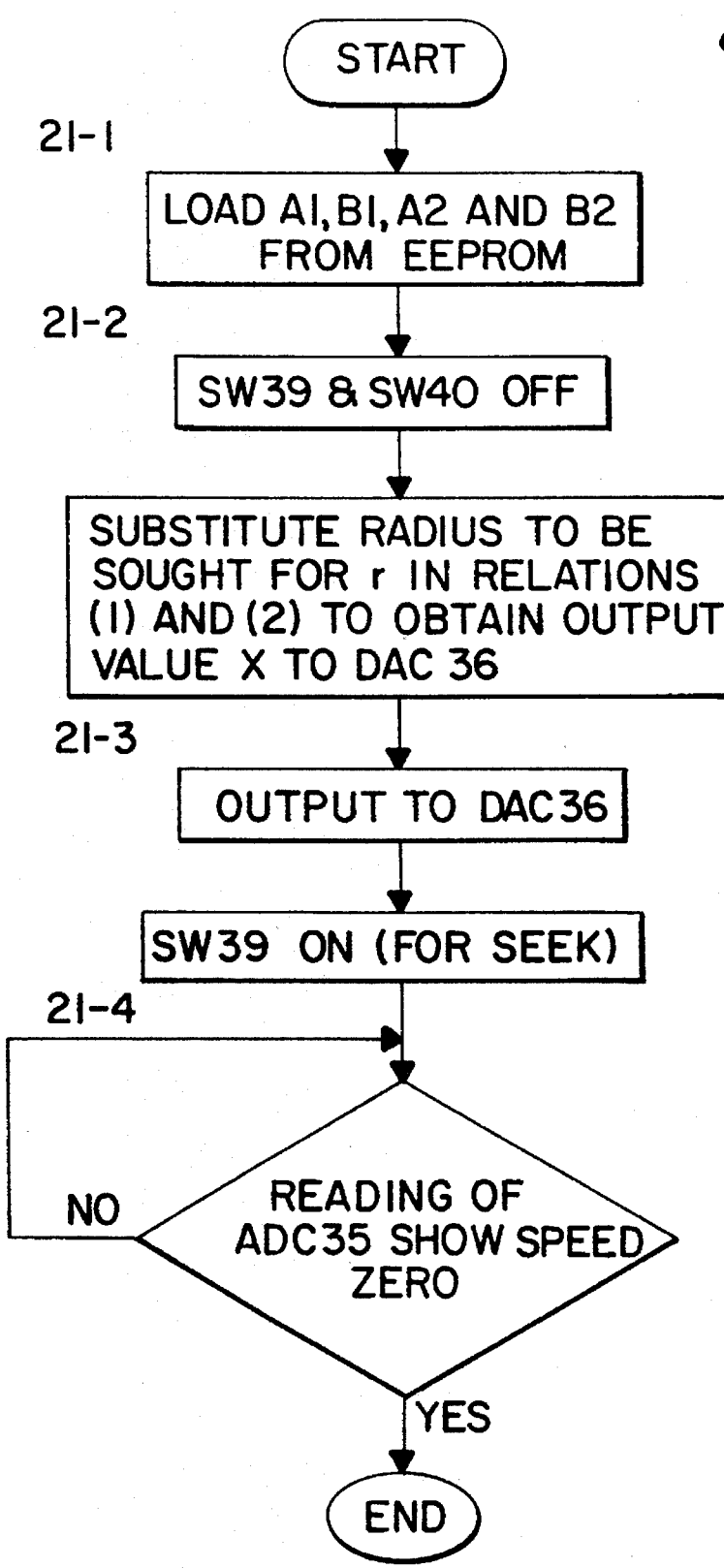
FIG. 21 is a flowchart showing seek processing according to a fourth embodiment of the present invention.

Next, a seek operation that employs the relationships established on the basis of the measured values will be explained with reference to FIG. 21.

Step 21-1

When the power supply is turned on, the processor 46 loads the coefficients A1, B1, A2 and B2 into the internal memory from the non-volatile memory 47.

Step 21-2

Prior to seek, the processor 46 turns off the first and second switches 39 and 40. Then, to calculate an output value X for the target position r, the processor 46 calculates the value Y of the AD converter 33 from the coefficients A2 and B2 and the target position r according to the equation (2). Thereafter, the processor 46 calculates a drive signal X for the DA converter 36 from the coefficients A1 and B1 and the calculated value Y of the AD converter 33 according to the equation (1).

Step 21-3

The processor 46 outputs the drive signal X to the DA converter 36 and turns on the first switch 39. Consequently, the subtraction circuit 37 generates a position error signal, which represents a difference between the position signal from the photo-sensitive light detector 18 and the drive signal X from the DA converter 36, and this position error signal is applied to the VCM coil 11b through the phase compensator 38, the first switch 39, the sum circuit 42 and the VCM drive;amplifier 43 to effect a seek operation.

Step 21-4

When the position error signal becomes zero, it is decided that the positioner 12 has been positioned at the target position, and the speed becomes zero. The processor 46 monitors the speed signal from the AD converter 35. When the speed signal becomes zero, the processor 46 decides that the seek has been completed, and terminates the seek operation.

Thus, driving characteristics are measured with variations in circuit and mechanical characteristics taken into consideration, and relational coefficients are obtained and stored in the memory. The coefficients are used to calculate a drive signal for the target position when seek is to be executed, thereby enabling an accurate seek operation. In addition, since the positioner is mechanically positioned at each of the outer and inner limits and then moved therefrom to a reference point, the reference point can be found early, and the limit positions can also be measured.

Although in the foregoing embodiment the positioner is positioned at the outer and inner limits to search for reference points, it should be noted that the present invention is not necessarily limited thereto and that it is also possible to search for reference points directly to obtain the relationship between the absolute position and the drive signal output to the DA converter.

Thus, the controller (processor) controls the drive output so as to position the positioner at two reference points, and measures the relationship between the position and the drive output from the position of each of the two points and the drive output, thereby measuring characteristics of each individual drive unit. The measured values are stored in the memory 47, and when the positioner 12 is to be driven under control, a drive output corresponding to the target position is calculated from the measured values stored. Thus, even if there are variations in circuit and mechanical characteristics, it is possible to effect accurate positioning control in conformity to each individual drive unit. In addition, since the required data is obtained by measurement, driving characteristics can be obtained accurately, and an accurate positioning operation can be realized with ease.

As many apparently widely different embodiments of the present invention can be made without departing from the spirit and scope thereof, it is to be understood that the invention is not limited to the specific embodiments thereof except in the appended claims.

What we claim is:

1. A seek control system used in an optical storage apparatus which at least reads information from an optical storage medium by applying light hereto, to a target position on said optical storage medium, said system comprising:

an optical head having at least a movable part mounted on a positioner, said positioner movably mounted on said optical storage apparatus;

means for moving said positioner;

first light-emitting means provided on said optical head for applying light to said optical storage medium;

a one-dimensional optical position detector having a photo-sensitive surface disposed along a path of movement of said positioner for outputting a position signal corresponding to a light spot on said photo-sensitive surface;

second light-emitting means, independent from said first light emitting means, provided either on said optical head or on said positioner for applying light to said one-dimensional optical position detector; and control means for controlling a movement of said positioner on the basis of said output of said one-dimensional optical position detector.

2. A seek control system for an optical storage apparatus as defined in claim 1, wherein said optical storage medium is an optical disk, said system further comprising means for rotating said optical disk, and said means for moving said positioner moves said positioner radially of said optical disk.

3. A seek control system for an optical storage apparatus as defined in claim 1, wherein said one-dimensional optical position detector and said second light-emitting means are provided on a side which faces away from a direction in which said first light emitting means provides light.

4. A seek control system for an optical storage apparatus as defined in claim 1, wherein said positioner has said optical head secured to one end and further has a coil provided on another end, said coil being current-driven by said control means.

5. A seek control system for an optical storage apparatus as defined in claim 4, wherein said optical head has:

a fixed optical head including at least said first light emitting means to illuminate said optical storage medium, and means for receiving reflected light from said optical storage medium and for converting the reflected light into an electric signal; and a movable optical head including an objective lens for applying said emitted light to said optical storage medium and for receiving the reflected light from said optical storage medium, and an actuator for driving said objective lens, said movable optical head being moved by said means for moving.

6. A seek control system for an optical storage apparatus as defined in claim 1, wherein said control means controls the drive of said positioner on the basis of a difference between a drive output corresponding to the target position and the detection output of said one-dimensional optical position detector.

7. A seek control system for an optical storage apparatus as defined in claim 1, wherein said control means changes a drive output for said positioner while confirming the position of said positioner by the detection output of said one-dimensional optical positioner detector, thereby moving said optical head to said target position.

8. A seek control system for an optical storage apparatus as defined in a claim 6, wherein said control means stores in memory measured values obtained by measuring a relationship between said target position and said drive output, and calculates a drive output corresponding to said target position on the basis of the measured values and outputs it.

9. A seek control system for an optical storage apparatus as defined in claim 8, wherein, to obtain said measured values, said control means drives said positioner with drive outputs for successively positioning said positioner at two predetermined points, and after positioning said positioner at each of the two predetermined points, said control means reads the detection output of said one-dimensional optical position detector and measures a relationship between said drive output and said detection output, and thereafter, said control means controls said drive output so as to position said positioner as two reference points successively, and reads the detection output of said one-dimensional optical position detector for each reference point to measure a relationship between said reference points and said detection output.

10. A seek control system for an optical storage apparatus as defined in claim 9, wherein said reference position is a boundary position between the groove zone and mirror zone of said optical disk.

11. A seek control system for an optical storage apparatus as defined in claim 2, wherein said one-dimensional optical position detector and said second light-emitting means are provided on a side which faces away from a direction in which said first light emitting means applies light through said optical head.

12. A seek control system for an optical storage apparatus as defined in claim 2, wherein said positioner has said optical head secured to one end and further has a coil provided on another end, said coil being current-driven by said control means.

13. A seek control system for an optical storage apparatus as defined in claim 12, wherein said positioner has a space for placing said rotating means between said optical head and said coil.

14. A seek control system for an optical storage apparatus as defined in claim 2, wherein said optical head has:
- a fixed optical head including at least said first light emitting means to illuminate said optical storage medium, and means for receiving reflected light from said optical storage medium and for converting the reflected light into an electric signal; and
- a movable optical head including an objective lens for applying said emitted light to said optical storage medium and for receiving the reflected light from said optical storage medium, and an actuator for driving said objective lens, said movable optical head being moved by said positioner.

15. A seek control system for an optical storage apparatus as defined in claim 2, wherein said control means controls the drive of said positioner on the basis of a difference between a drive output corresponding to the target position and the detection output of said one-dimensional optical position detector.

16. A seek control system for an optical storage apparatus as defined in claim 2, wherein said control means changes a drive output for said positioner while confirming the position of said positioner by the detection output of said one-dimensional optical position detector, thereby moving said optical head to said target position.

17. A seek control system for an optical storage apparatus as defined in claim 2, wherein said optical disk has a user zone having grooves, and a zone other than said user zone, said control means effecting seek control using the detection output of said one-dimensional optical position detector for a seek operation of moving said optical head to the zone other than said user zone.

18. A seek control system for an optical storage apparatus as defined in claim 3, wherein said positioner has said optical head secured to one end and further has a coil provided on another end, said coil being current-driven by said control means.

19. A seek control system for an optical storage apparatus as defined in claim 18, wherein said optical storage medium is an optical disk, said system further comprising means for rotating said optical disk, said means for moving said positioner moves said positioner radially of said optical disk, and said positioner has a space for placing said rotating means between said optical head and said coil.

20. A seek control system for an optical storage apparatus as defined in claim 2, wherein said optical head has:
- a fixed optical head including at least said first light emitting means to illuminate said optical storage medium, and means for receiving reflected light from said optical storage medium and for converting the reflected light into an electric signal; and
- a movable optical head including an objective lens for applying said emitted light to said optical storage medium and for receiving the reflected light from said optical storage medium, and an actuator for driving said objective lens, said movable optical head being moved by said means for moving.

21. A seek control system for an optical storage apparatus as defined in claim 3, wherein said control means controls the drive of said positioner on the basis of a difference between a drive output corresponding to the target position and the detection output of said one-dimensional optical position detector.

22. A seek control system for an optical storage apparatus as defined in claim 3, wherein said control means changes a drive output for said positioner while confirming the position of said positioner by the detection output of said one-dimensional optical position detector, thereby moving said optical head to said target position.

23. A seek control system for an optical storage apparatus as defined in claim 3, wherein said optical storage medium is an optical disk having a user zone having grooves, and a zone other than said user zone, said system further comprising means for rotating said optical disk, and said control means effecting seek control using the detection output of said one-dimensional optical position detector for a seek operation of moving said optical head to the zone other than said user zone.

24. A seek control system for an optical storage apparatus as defined in claim 4, wherein said optical storage medium is an optical disk, said system further comprising means for rotating said optical disk, and said means for moving said positioner moves said positioner radially of said optical disk, and said positioner has a space for placing said rotating means between said optical head and said coil.

25. A seek control system for an optical storage apparatus as defined in claim 2, wherein said optical head has:
- a fixed optical head including at least said first light emitting means to illuminate said optical storage medium, and means for receiving reflected light from said optical storage medium and for converting the reflected light into an electric signal; and
- a movable optical head including an objective lens for applying said emitted light to said optical storage medium and for receiving the reflected light from said optical storage medium, and an actuator for driving said objective lens, said movable optical head being moved by said means for moving.

26. A seek control system for an optical storage apparatus as defined in claim 4, wherein said control means controls the drive of said positioner on the basis of a difference between a drive output corresponding to the target position and the detection output of said one-dimensional optical position detector.

27. A seek control system for an optical storage apparatus as defined in claim 4, wherein said control means changes a drive output for said positioner while confirming the position of said positioner by the detection output of said one-dimensional optical position detector, thereby moving said optical head to said target position.

28. A seek control system for an optical storage apparatus as defined in claim 4, wherein said optical storage medium is an optical disk having a user zone having grooves, and a zone other than said user zone, said system further comprising means for rotating said optical disk, and said control means effecting seek control using the detection output of said one-dimensional optical position detector for a seek operation of moving said optical head to the zone other than said user zone.

29. A seek control system used in an optical storage apparatus, which at least reads information from an optical storage medium by applying light thereto, to a target position on said optical storage medium, said system comprising:
- an optical head having at least a movable part mounted on a positioner, said positioner movably mounted on said optical storage apparatus:
- means for moving said positioner:
- first light-emitting means provided on said optical head for applying light to said optical storage medium;
- a one-dimensional optical position detector having a photo-sensitive surface disposed along a path of movement of said positioner for outputting a position signal corresponding to a light spot on said photo-sensitive surface;
- second light emitting means provided either on said optical head or on said positioner for applying light to said one-dimensional optical position detector; and
- control means for controlling a movement of said positioner on the basis of said output of said one-dimensional optical position detector; wherein said control means controls the drive of said positioner on the basis of a difference between a drive output corresponding to the target position and the detection output of said one-dimensional optical position detector;

said control means stores, in a memory, measured values obtained by measuring a relationship between said target position and said drive output, and calculates a drive output corresponding to said target position on the basis of the measured values and outputs it;

said control means drives said positioner, to obtain said measured values, with drive outputs for successively positioning said positioner at two predetermined points, and said control means reads the detection output of said one-dimensional optical position detector and measures a relationship between said drive output and said detection output, and thereafter, said control means controls said drive output so as to position said positioner at two reference points successively, and reads the detection output of said one-dimensional optical position detector for each reference point to measure a relationship between said reference points and said detection output.

30. A seek control system for an optical storage apparatus as defined in claim 29, wherein said reference position is a boundary position between the groove zone and mirror zone of said optical disk.

31. A seek control system used in an optical storage apparatus, which at least reads information from an optical storage medium by applying light thereto, to a target position on said optical storage medium, said system comprising:
- an optical head having at least a movable part mounted on a positioner, said positioner movably mounted on said optical storage apparatus:
- means for moving said positioner;
- a one-dimensional optical position detector having a photo-sensitive surface disposed along a path of movement of said positioner for outputting a position signal corresponding to a light spot on said photo-sensitive surface;
- light-emitting means provided either on said optical head for applying light to said one-dimensional optical position detector;
- a memory for storing measured values obtained by measuring a relationship between said target position and a drive output; and
- control means for storing in said memory said measured values by measuring a relationship between said target position and said drive output, calculating a drive output corresponding to said target position on the basis of the measured values and controlling the drive of said means for moving on the basis of a difference between the drive output corresponding to the target position and the detection output of said one-dimensional optical position detector.

* * * * *

UNITED STATES PATENT AND TRADEMARK OFFICE
CERTIFICATE OF CORRECTION

PATENT NO. : 5,481,510
DATED : January 2, 1996
INVENTOR(S) : Masaki et al.

It is certified that error appears in the above-indentified patent and that said Letters Patent is hereby corrected as shown below:

Column 4, line 21, delete "VEM" and insert --VCM--.

Column 5, line 14, delete "1ob" and insert --10b--.

Column 5, line 49, delete "Iob" and insert --10b--.

Column 6, line 49, delete "objective;" and insert --objective--.

Column 8, line 25, delete "FEB" and insert --FES--.

Column 8, line 28, delete "FEB" and insert --FES--.

Column 8, line 34, delete "BUM" and insert --SUM--.

Column 9, line 2, delete "LPOB" and insert --LPOS--.

Column 9, line 10, delete "LPOB" and insert --LPOS--.

UNITED STATES PATENT AND TRADEMARK OFFICE
CERTIFICATE OF CORRECTION

PATENT NO. : 5,481,510
DATED : January 2, 1996
INVENTOR(S) : Masaki et al.

It is certified that error appears in the above-indentified patent and that said Letters Patent is hereby corrected as shown below:

Column 21, line 11, after "in" (first occurrence) delete "a".

Column 21, line 11, after "stores in" insert --a--.

Column 23, line 42, delete ":" and insert --;--.

Column 23, line 43, delete ":" and insert --;--.

Column 24, line 35, delete ":" and insert --;--.

Signed and Sealed this

Tenth Day of June, 1997

BRUCE LEHMAN

Attest:

Attesting Officer

Commissioner of Patents and Trademarks